United States Patent
Schleppenbach et al.

(10) Patent No.: US 7,018,209 B2
(45) Date of Patent: Mar. 28, 2006

(54) APPARATUS AND METHODS FOR A SHAPE MEMORY SPRING ACTUATOR AND DISPLAY

(75) Inventors: David A. Schleppenbach, West Lafayette, IN (US); Wunji Lau, West Lafayette, IN (US); Joe P. Said, West Lafayette, IN (US)

(73) Assignee: Purdue Research Foundation, West LaFayette, IN (US)

(*) Notice: Subject to any disclaimer, the term of this patent is extended or adjusted under 35 U.S.C. 154(b) by 0 days.

(21) Appl. No.: 10/748,742

(22) Filed: Dec. 30, 2003

(65) Prior Publication Data

US 2005/0069842 A1   Mar. 31, 2005

Related U.S. Application Data

(62) Division of application No. 09/040,871, filed on Mar. 18, 1998, now Pat. No. 6,705,868.

(60) Provisional application No. 60/069,581, filed on Dec. 12, 1997, provisional application No. 60/041,876, filed on Apr. 11, 1997, provisional application No. 60/040,518, filed on Mar. 18, 1997.

(51) Int. Cl.
*G09B 21/00* (2006.01)

(52) U.S. Cl. .................. 434/114; 434/112; 148/580

(58) Field of Classification Search ........ 434/112–117, 434/258, 365; 400/124.14; 310/332; 607/88; 345/108; 148/320, 335, 566, 580, 908; 266/249
See application file for complete search history.

(56) References Cited

U.S. PATENT DOCUMENTS 3,586,451 A   6/1971 Canton
3,652,173 A   3/1972 Miller et al.
3,653,777 A   4/1972 Bross
3,659,354 A   5/1972 Sutherland
3,661,655 A * 5/1972 Hrusovsky .................. 148/578
3,951,554 A   4/1976 Jonkers
4,025,061 A * 5/1977 Frei ............................ 266/249
4,033,053 A   7/1977 Engler
4,037,200 A   7/1977 Cranmer
4,115,015 A   9/1978 Torii (Continued)

FOREIGN PATENT DOCUMENTS

DE   39 29 275 C1   3/1991

(Continued)

OTHER PUBLICATIONS

Haptic: A Haptic Tactile Display for the Presentation of Two-Dimensional Virtual or Remote Environments, AL/CF-TR-1995-0104, Mar. 1995, Report of Defense Technical Information Center, Ft. Belvoir, Virginia. NIH Grant No. 2 R44 EY06512-02, Final Report, "Electronic Braille Output Device Using Nitinol," Submitted by TiNi Alloy Co., Oakland, CA, Feb. 9, 1990.

(Continued)

*Primary Examiner*—Joe H. Cheng
(74) *Attorney, Agent, or Firm*—Woodard, Emhardt, Moriarty, McNett & Henry LLP

(57) ABSTRACT

Various apparatus and methods for an actuator and display using one or more shape memory springs. A shape memory spring is heated and urges a pin to a first or extended position. The pin may be supported in the first position by a supporting mechanism. The shape memory spring is heated electrically, and in some embodiments under the control of a processor. The present invention may be used to display information provided in a user interface from a computer program, including text, numerical data, and graphical images.

4 Claims, 12 Drawing Sheets

U.S. PATENT DOCUMENTS

| | | | | |
|---|---|---|---|---|
| 4,194,190 | A | 3/1980 | Bareau | |
| 4,222,799 | A * | 9/1980 | Hijikata et al. | 148/568 |
| 4,266,936 | A | 5/1981 | Rose et al. | |
| 4,275,370 | A * | 6/1981 | Sims | 335/37 |
| 4,283,178 | A | 8/1981 | Tetzlaff | |
| 4,285,039 | A | 8/1981 | Patterson et al. | |
| 4,404,764 | A | 9/1983 | Wills et al. | |
| 4,473,356 | A | 9/1984 | Fernando et al. | |
| 4,500,293 | A | 2/1985 | Eltgen | |
| 4,553,393 | A | 11/1985 | Ruoff | |
| 4,556,934 | A | 12/1985 | Lemme et al. | |
| 4,556,935 | A | 12/1985 | Lemme | |
| 4,559,512 | A | 12/1985 | Yaeger et al. | |
| 4,571,190 | A | 2/1986 | Zagier et al. | |
| 4,586,335 | A * | 5/1986 | Hosoda et al. | 60/528 |
| 4,586,904 | A | 5/1986 | Chlumsky | |
| 4,619,320 | A * | 10/1986 | Adnyana et al. | 166/66.7 |
| 4,621,882 | A | 11/1986 | Krumme | |
| 4,633,121 | A * | 12/1986 | Ogawa et al. | 310/332 |
| 4,650,352 | A | 3/1987 | Eriksson | |
| 4,653,942 | A | 3/1987 | Soloveychik et al. | |
| 4,664,632 | A | 5/1987 | Tretiakoff et al. | |
| 4,665,334 | A | 5/1987 | Jamieson | |
| 4,701,293 | A | 10/1987 | Mead | |
| 4,707,148 | A | 11/1987 | Richmond | |
| 4,752,772 | A | 6/1988 | Litt et al. | |
| 4,758,165 | A | 7/1988 | Tieman et al. | |
| 4,761,955 | A | 8/1988 | Bloch | |
| 4,765,139 | A | 8/1988 | Wood | |
| 4,772,205 | A | 9/1988 | Chlumsky et al. | |
| 4,806,815 | A * | 2/1989 | Honma | 310/307 |
| 4,811,564 | A | 3/1989 | Palmer | |
| 4,836,784 | A | 6/1989 | Joachim | |
| 4,860,040 | A * | 8/1989 | Tamamura et al. | 396/89 |
| 4,871,992 | A | 10/1989 | Peterson | |
| 4,898,536 | A | 2/1990 | Hoffarth | |
| 4,932,210 | A | 6/1990 | Julien et al. | |
| 5,040,283 | A | 8/1991 | Pelgrom | |
| 5,070,697 | A | 12/1991 | Van Zeggeren | |
| 5,086,287 | A | 2/1992 | Nutzel | |
| 5,092,781 | A * | 3/1992 | Casciotti et al. | 439/62 |
| 5,107,235 | A | 4/1992 | Torres-Isea | |
| 5,107,916 | A | 4/1992 | Van Roermund et al. | |
| 5,127,228 | A | 7/1992 | Swenson | |
| 5,152,851 | A * | 10/1992 | Yamamoto et al. | 148/333 |
| 5,165,897 | A | 11/1992 | Johnson | |
| 5,186,629 | A | 2/1993 | Rohen | |
| 5,188,145 | A | 2/1993 | Mathieu | |
| 5,195,894 | A | 3/1993 | Le Blanc et al. | |
| 5,197,418 | A | 3/1993 | Wissmann et al. | |
| 5,209,584 | A | 5/1993 | Galarneau | |
| 5,225,008 | A * | 7/1993 | Koyama et al. | 148/580 |
| 5,226,817 | A | 7/1993 | Nakajima et al. | |
| 5,226,979 | A * | 7/1993 | Thoma | 148/402 |
| 5,286,199 | A | 2/1994 | Kipke | |
| 5,293,464 | A | 3/1994 | Hirano et al. | |
| 5,302,216 | A * | 4/1994 | Sugita et al. | 148/595 |
| 5,310,521 | A * | 5/1994 | Asseiro et al. | 420/109 |
| 5,368,656 | A * | 11/1994 | Heitmann et al. | 148/333 |
| 5,426,837 | A | 6/1995 | Tieman | |
| 5,449,292 | A * | 9/1995 | Tani et al. | 434/114 |
| 5,453,012 | A | 9/1995 | Hudecek | |
| 5,496,174 | A | 3/1996 | Garner | |
| 5,502,965 | A | 4/1996 | Hornhauer et al. | |
| 5,510,598 | A | 4/1996 | Kawam et al. | |
| 5,574,830 | A | 11/1996 | Quzilleau | |
| 5,575,973 | A * | 11/1996 | Choi et al. | 420/112 |
| 5,579,992 | A * | 12/1996 | Masatoshi et al. | 236/12.21 |
| 5,580,251 | A | 12/1996 | Gilkes et al. | |
| 5,583,478 | A | 12/1996 | Renzi | |
| 5,588,295 | A | 12/1996 | Brotz | |
| 5,629,662 | A | 5/1997 | Floyd et al. | |
| 5,665,179 | A * | 9/1997 | Izawa et al. | 148/226 |
| 5,685,721 | A | 11/1997 | Decker | |
| 5,717,423 | A * | 2/1998 | Parker | 345/108 |
| 5,718,588 | A | 2/1998 | Tretiakoff et al. | |
| 5,782,896 | A * | 7/1998 | Chen et al. | 607/88 |
| 6,022,220 | A | 2/2000 | Haugen | |
| 6,085,871 | A | 7/2000 | Karamata | |
| 6,132,533 | A * | 10/2000 | Cofrade et al. | 148/580 |
| 6,224,755 | B1* | 5/2001 | Schamberg et al. | 210/149 |
| 6,235,131 | B1* | 5/2001 | Keihle et al. | 148/580 |
| 6,696,185 | B1* | 2/2004 | Okamoto | 429/12 |

FOREIGN PATENT DOCUMENTS

| | | |
|---|---|---|
| FR | 2 718 266 | 10/1995 |
| JP | 59-198483 | 11/1984 |
| JP | 61-166580 | 7/1986 |
| JP | 2-134674 | 5/1990 |
| JP | 5-300705 | 11/1993 |
| JP | 6-227051 | 8/1994 |

OTHER PUBLICATIONS

Patent Abstracts of Japan, vol. 1999, No. 12, Oct. 29, 1999 JP 11 184369 A (Mitsubishi Cable Ind. Ltd.), Jul. 9, 1999 *translated*.

Patent Abstracts of Japan, vol. 1995, No. 08, Sep. 29, 1995 JP 07 119619 A (Ricoh Co. Ltd.), May 9, 1995 *translated*.

Patent Abstracts of Japan, vol. 007, No. 089 (M207), Apr. 13, 1983 JP 58 013242 A (Sharp KK), Jan. 25, 1983 *translated*.

NIH Grant No. 2 R44 EY06512-02, Final Report, Electronic Braille Output Device Using Nitinol, Submitted by TiNi Alloy Co., Oakland, CA, Feb. 9, 1990.

* cited by examiner

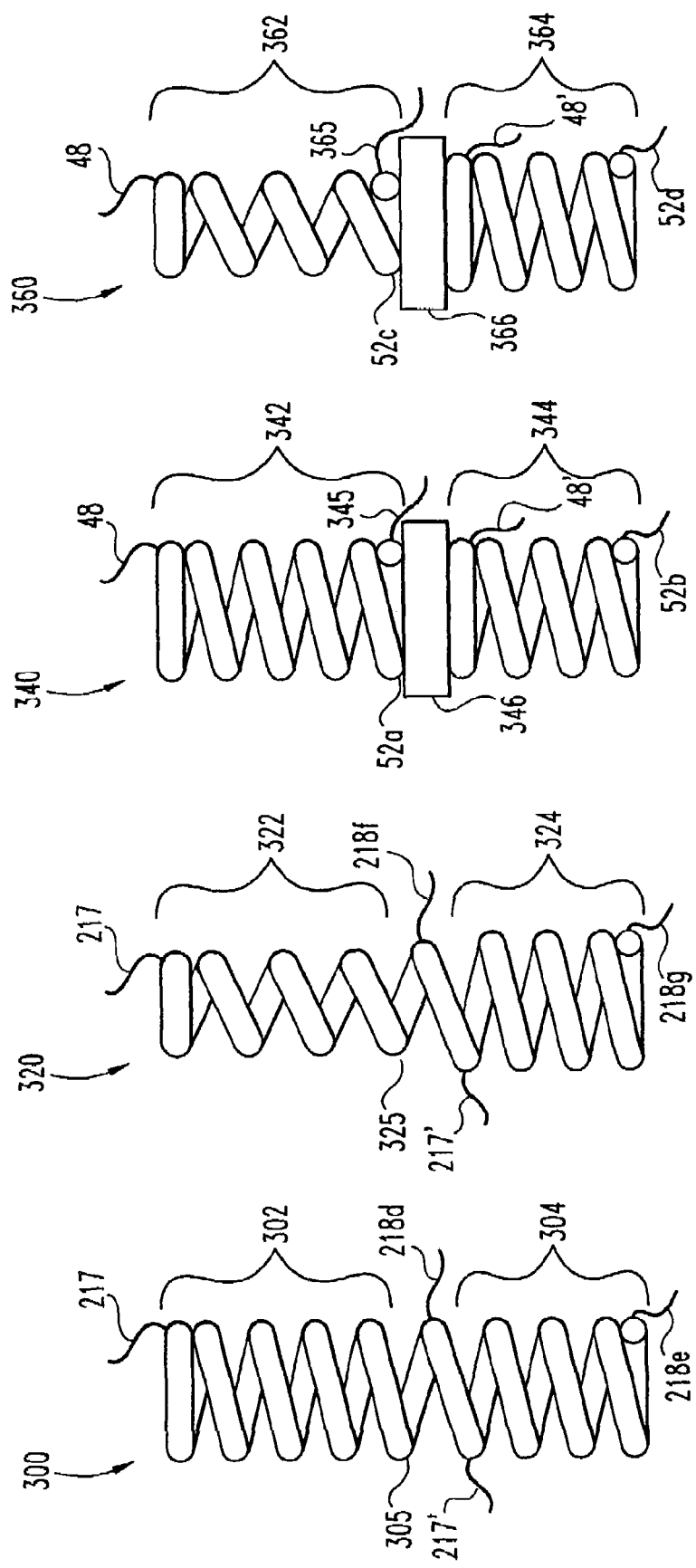

APPARATUS AND METHODS FOR A SHAPE MEMORY SPRING ACTUATOR AND DISPLAY

This application is a divisional of patent application Ser. No. 09/040,871, filed Mar. 18, 1998, now U.S. Pat. No. 6,705,868 B1, which claims the benefit of priority of U.S. provisional application Ser. Nos. 60/040,518, filed Mar. 18, 1997; 60/041,876, filed Apr. 11, 1997; and 60/069,581, filed Dec. 12, 1997.

BACKGROUND OF THE INVENTION

The present invention concerns various apparatus and methods for and actuator and display using a shape memory spring. More particularly, the invention defines various apparatus and methods for imparting tactile information to visually impaired persons, especially by a computer controlled haptic display. However, certain applications of the present invention may be outside of this field.

Persons with impaired vision rely upon haptic inputs, those inputs related to the sense of touch, to receive data and appropriate that data into a network of related information. There are several different methods for providing haptic inputs. For example, visually impaired students may be taught stereochemistry through the use of three-dimensional molecular models. Also, braille has traditionally been used for representing words. Printers capable of braille embossing now have the ability to make "dot art" or pictures made up of closely-spaced braille dots. Yet another technique includes the use of tactile image paper, which is specially treated so that inked areas on the paper will rise when heated in a special machine.

The solutions thus described suffer from several drawbacks. One drawback is that the haptic information is presented in a more or less permanent form. Presentation of additional haptic information requires fabricating another haptic display, such as another molecular model or another braille-embossed sheet of paper. Another drawback is that fabrication of the additional haptic display could require considerable time. Yet a third drawback of these methods is that fabrication of the additional display may require equipment that is expensive or bulky.

The methods described are not fully compatible with the long distance, rapid communication of large amounts of data made possible by modern electronics. There is a need for haptic devices that are both computer controlled and refreshable. One approach to such a solution uses piezoelectric actuators to raise and lower an array of braille dots. Such apparatus have proven to be bulky, fragile, and costly. There is a need for a two-dimensional refreshable haptic display with reduced size, weight, and cost, and improved reliability.

SUMMARY OF THE INVENTION

The present invention provides for an apparatus that includes a first spring made from a shape-memory material. The apparatus includes an electrical power supply for heating the first spring, the electrical power supply being constructed and arranged for passing electrical current through the first spring. The apparatus includes a second spring and a member with a surface, the member defining a hole. The apparatus includes a pin urged in a first direction by the first spring after the first spring is heated. The pin is urged in a second direction by the second spring, the first direction being generally opposite of said second direction. The pin has a first position wherein a portion of the pin passes through the hole and extends beyond the surface. The apparatus includes a supporting mechanism for supporting the pin in the first position.

It is an object of the present invention to provide an improved actuator which is actuated by heating a shape-memory spring.

Other objects of the present invention will be apparent from the description of the drawings, the description of the preferred embodiment, the claims, and the drawings herein.

DESCRIPTION OF THE DRAWINGS

FIG. 10 is a sectional view of a shape memory spring according to one embodiment of the present invention.

FIG. 11 is a sectional view of a shape memory spring according to one embodiment of the present invention.

FIG. 12 is a sectional view of a shape memory spring according to one embodiment of the present invention.

FIG. 13 is a schematic of a circuit according to one embodiment of the present invention.

DESCRIPTION OF THE PREFERRED EMBODIMENT

Figure 1:
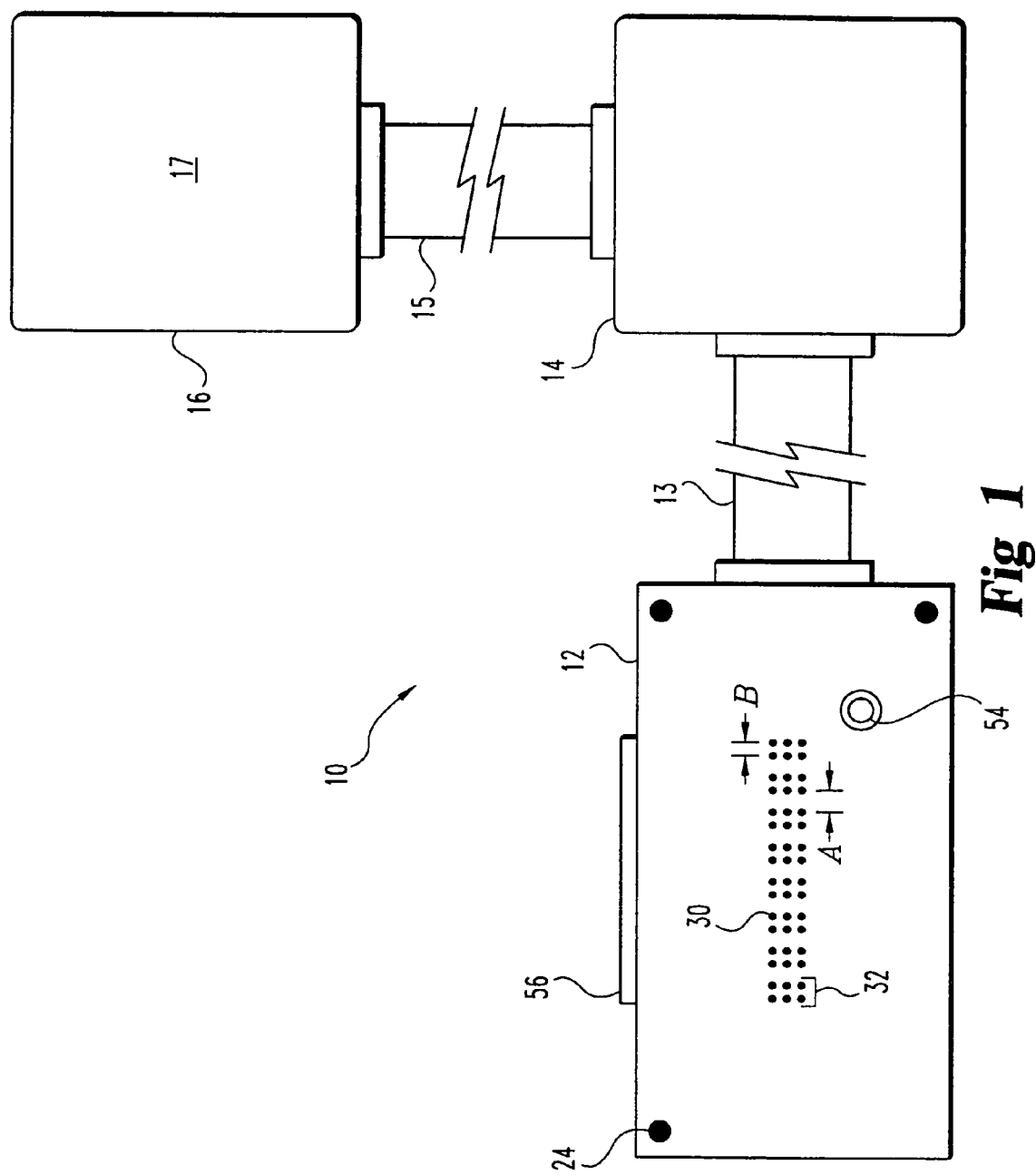
FIG. 1 is a diagrammatic representation of a display system according to an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention concerns a method and apparatus for raising and lowering an array of dots according to signals received from a computer. The array can be small, for example, 48 dots arranged in 3 rows and 16 columns, for construction of braille words and sentences. In another embodiment, a larger array of dots, for example, 100 rows by 100 columns, can be used for construction of pictures, graphs, and diagrams. By way of illustration only, an array of 48 dots in 3 rows and 16 columns will be described, but those of ordinary skill in the art will recognize the scalability of the display to larger or smaller sizes, including eight pin braille cells, haptic displays for automated teller machines (ATM), clocks, paper embossers, and other devices benefitting from a haptic output. The present invention is also sutied to being packaged in six or eight pin arrays as a braille cell. Such cell can be convieniently packaged on various integrated circuit chip of standard configurations, for example on a fourteen pin 74LS138 demultiplexer.

Figure 2:
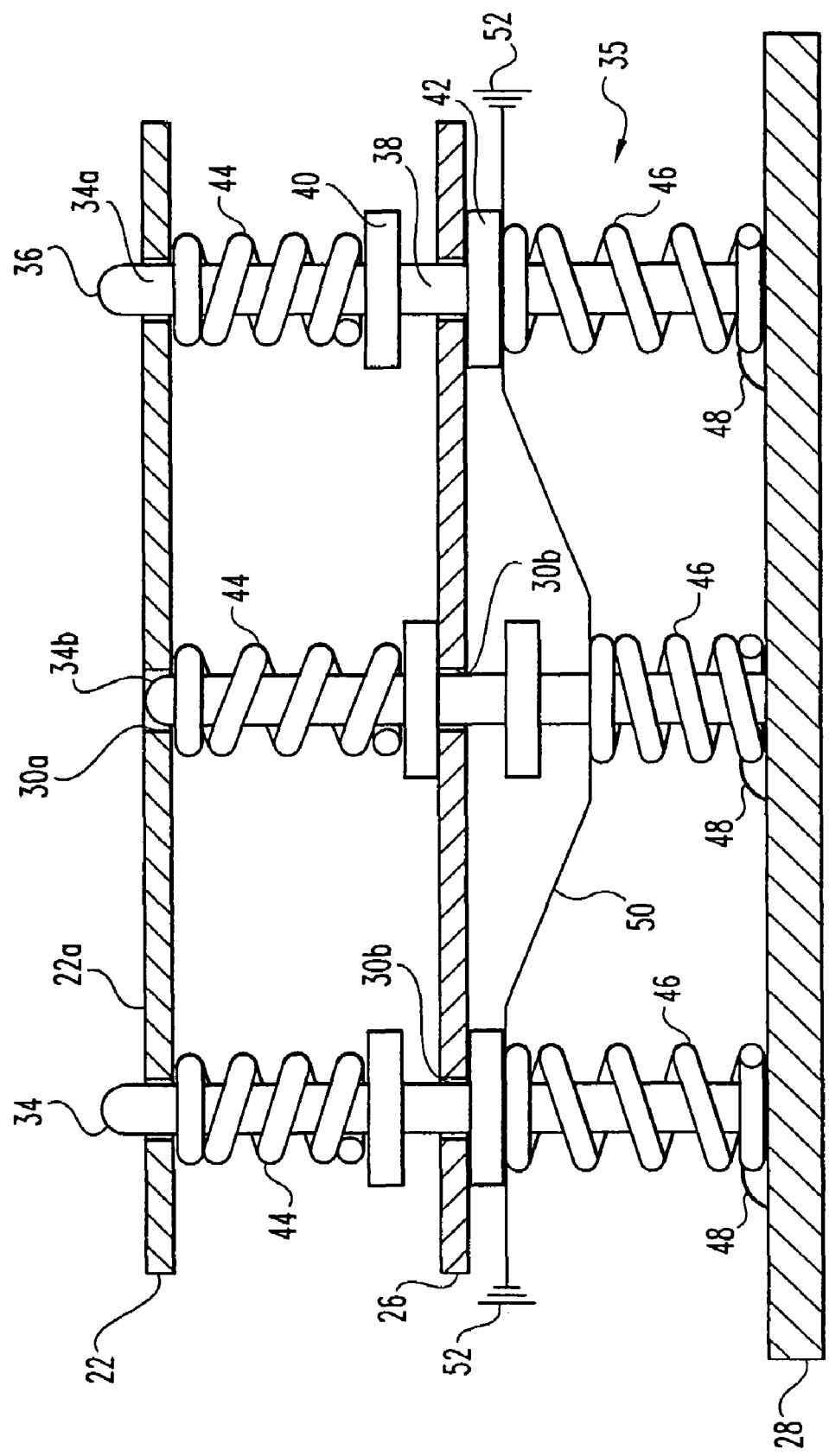
FIG. 2 is a diagrammatic representation of a sectional cutaway of a portion of the display of FIG. 1

FIGS. 1 and 2 diagrammatically depict the first embodiment of the present invention. Refreshable haptic display system 10 includes haptic display 12 which receives signals via means for transmission 13 from display controller 14. Controller 14 receives command signals via means for transmission 15 from computer processor 16. Processor 16 has within it software program 17. Program 17 includes an embodiment of text, graphics, or other information in a user interface that a user would like to transmit to display 12. By way of example only, the user interface could be the time or date when the present invention is utilized with a clock, or finanacial data when the present invention is utilized with an ATM, or other data such as queries or representation of numeric, text, or graphical data from programs such as Microsoft Word, Excel, or Power Point. Software 17 also includes the algorithms necessary to transmit the user interface as signals to controller 14 which can ultimately produce the desired responses in display 12. By way of example only, program 17 could include ASCII characters, an algorithm for translating the ASCII characters into Braille characters, and an algorithm for transmitting the Braille characters in the proper manner to controller 14.

Although specific elements of system 10 have been described, various substitutions and other changes would be apparent to those of ordinary skill in the art. For example, controller 14 has been shown as separate from display 12, but could also be integrated within display 12. Transmission means 13 and 15 are diagrammatically depicted as electrical harnesses with connectors but could also be wireless means, relying on infrared or radio frequency signals being passed between the appropriate transmitters and receivers. By way of further example, software 17 need not reside wholly within computer 16, but could also be partitioned and contained within controller 14 or display 12.

Display 12 includes a top plate member 22 connected by fasteners 24 to a midplate member 26 and circuit board 28. It is preferable that plates 22 and 26 be fabricated from a lightweight, electrically insulating material that presents low resistance to sliding.

Member 22 includes a surface 22a and defines an array of holes 30a arranged in three rows and 16 columns. These holes 30a are further arranged in groupings 32 of two columns each. Each of the eight groupings 32 are spaced apart from each other by dimension A, which is preferably about 0.24 inches. Within a particular braille cell or grouping 32, the holes are separated by dimension B which is preferably 0.095 inches. The preferred values for A and B are compatible with standard braille requirements. Other values for A and B are possible, provided that A is sufficiently larger than B so that the user will be able to haptically note one grouping 32 from another grouping 32. Although eight groupings 32 have been depicted, it is easy to see that the display can be made larger or smaller, to provide more or less haptic information.

Slidably located within each hole 30a is a corresponding pin 34. At the top of each pin 34 is a pinhead 36 which is preferably rounded, beveled or chamfered. Pin 34 includes a shaft section 38 that extends through holes 30b within midplate member 26 and which terminate above circuit board 28. Pins 34 are slidable within holes 30a and 30b. Holes 30b are generally aligned with and correspond to holes 30a. Pins 34 are preferably fabricated from a rod or tubing of material that slides easily within the materials chosen for plates 22 and 26. The rod material should preferably be lightweight, and both electrically and thermally insulating.

Each assembly of one or more pins, shape memory spring, and heating means such as the various resistive or thermoelectric heaters, and their alternatives and equivalents described herein, comprise an actuator 35. The pin is actuated to a different position in response to heating of the shape memory spring. Although various embodiments will be discussed in which actuator 35 is applied to provide haptic information, those of ordinary skill in the art will recognize other uses for actuator 35.

Each pinhead 36 corresponds to a dot within a braille matrix when a pin 34 is in the 34a upward or first position. The user can touch head 36 with his fingers. Pinhead 36 fits within and is slidable in hole 30a. When pin 34 is in the 34b second position, pinhead 36 is depicted below the top surface of cover plate 22. Those of ordinary skill in the art will also recognize an alternate construction that if head 36 were made slightly larger than hole 30a, then head 36 could also serve as a downward mechanical stop for pin 34 in the 34b downward position. In this alternate construction, head 36 could be separately fabricated from pin 34 and then bonded thereto. In this alternate construction head 36 would be approximately flush with the top surface of plate 22 when pin 34 is in the 34b downward position, and would be discernably above the top surface of plate 22 when pin 34 is in the 34a upward position. Thus, the user will be able to haptically discern between the 34a and 34b positions.

The motion of pins 34 is constrained in some embodiments by a downward stop 40 and an upward stop 42 attached to or integral with each shaft 38. Downward stop 40 is located above plate 26 and prevents downward motion of shaft 38 when stop 40 is in contact with plate 26. Upward stop 42 is located on shaft 38 beneath plate 26 and prevents upward motion of shaft 38 when stop 42 is in contact with the bottom surface of plate 26. Stops 40 and 42 are similar to washers, and have an inner diameter approximately equal to the outer diameter of shaft 38. Stops 40 and 42 are attached in position to shaft 38. Alternatively, stops 40 and 42 could also be integral with shafts 38. Other embodiments of the present invention include upward or downward stop within a support mechanism that supports pin 34 in the first position.

Located between the top surface of stop 40 and the bottom surface of plate 22 is second spring 44. Spring 44 is preferably a coil spring that urges pin 34 to the 34b second or downward position. Spring 44 is preferably located concentrically about the shaft 38. Spring 34 is in contact with both the bottom surface of plate 22 and mechanical stop 40 when pin 34 is in the 34a first or upward position. In the 34b downward position, it is preferable that spring 44 remain in contact with both plate 22 and stop 40, although it is permissible that spring 44 have a free length less than the distance between the bottom surface of plate 22 and the top surface of stop 40.

Located between stop 42 and circuit board 28 is first spring 46. Spring 46 is a coil spring preferably located concentrically about shaft 38. Spring 46 is fabricated from a shape memory material or super elastic alloy such as the nickel-titanium alloy known as Nitinol, and also the alloys known under the Tinel, Flexinol, Muscle Wire, Smart Wire, Dynalloy, NiTi, and TiNi trademarks, and other shape memory materials. A shape memory or superelastic alloy can be formed into a "remembered" or predisposed shape which it will "remember" even after the material has been substantially deformed away from this shape. When it is in the austenitic superelastic temperature range, this material will allow substantial deformation to occur away from its predisposed shape on the application of external stresses, and will return to its predisposed shape when the external stresses are removed. At lower temperature ranges, the material will not entirely regain its predisposed shape on the removal of external stresses, but will regain the remainder of its predisposed shape upon heating back into the material's superelastic temperature range. In the lowest martensitic temperature range, the material will stay deformed after stress on it has been released, but will resume its remembered predisposed shape when heated back into its superelastic austenitic temperature range.

In some embodiments, spring 46 in its predisposed shape is in contact with both the bottom side of mechanical stop 42 and the top side of circuit board 28. Near circuit board 28, spring 46 has first electrical connection 48 to a signal path of circuit board 28. Near stop 42 spring 46 has second connection 50 to ground plane 52. Each connection 48 to a spring 46 is an individual connection in some embodiments. Connections 50 to ground plane 42 may include more than one spring 46. Connection 50 should be flexible, and not interfere with the motion of pin 34 or impose a significant mechanical load on springs 46. Each spring 46 preferrably represents a separate resistance circuit path to ground.

Display 12 represents braille information as controller 14 selectively energizes the appropriate springs 46. When a specific braille character requires that a particular pin 34 be raised to the 34a upward position, controller 14 provides electrical current through connection 48 to spring 46 of that particular pin 34. Application of current results in resistance heating of spring 46. As the temperature of spring 46 increases beyond the transition temperature of the shape memory alloy, spring 46 reverts to its predisposed configuration. The predisposed configuration of spring 46 is of a length greater than the distance between the two surfaces spring 46 pushes against, which is the top surface of circuit board 28 and the bottom surface of stop 42. Although one embodiment of the present invention has been described in which spring 46 is resistively heated, other embodiments of the present invention include a separate heater for heating spring 46, as will be described later.

The wire diameter of spring 46, number of coils, diameter of coils, and free height of the spring, are consistent with the ability of spring 46 to push against circuit board 28 and stop 42 such that the weight of pin 34, stops 42 and 40, and spring 44 are supported. In addition, spring 46 will resist the downward force created when the user's finger touches head 36. Spring 46 also resists the downward spring force created by spring 44 pushing between plate 22 and stop 40.

In one form, spring 46 is fabricated from a nickel-titanium alloy. The spring was fabricated from wire of about 0.008 inches diameter, and wound with an outer diameter of about 0.13 inches and a free length of about 0.25 inches. This spring supported a weight of about 50 grams at a compression of about 50% of its free length upon heating past the transition temperature of 31 degrees C. In another form, spring 46 was wound from a nickel titanium alloy with a transition temperature of about 30 to 50 degrees C., using a wire diameter of about 0.006 to 0.008 inches. The spring was fabricated as a compression spring with and outer diameter of about 0.09 inches, a free length of about 0.25 inches, and a pitch of active coils of 10 to 12 active coils over the free length. The specific dimensions, capacities, characteristics, and temperatures are provided by way of illustration only. Those of ordinary skill in the art will recognize that specific dimensions, capacities, temperatures, and characteristics of the spring will depend upon the specific application.

Springs of different design are also encompassed within the present invention. For example, shape memory materials with higher transition temperatures are also envisioned. In addition, although springs 44 and 46 have been shown as compression coil springs, those of ordinary skill in the art will recognize that the various embodiments of the present invention may also include the use of tension coil springs. By way of example only, a tension spring 46 could be located where compression spring 44 is shown in FIG. 2. Likewise, a tension spring 44 would be located where compression spring 46 is shown in FIG. 2. Heating of tension spring 46 would cause it to urge pin 34 to the first position by pulling the pin.

Although spring 46 has been described and depicted as a single spring, the present invention also contemplates embodiments with dual concentric shape memory springs, such that a first shape memory spring is located inside a second larger shape memory spring. Such springs can be heated resistively by separate electrical circuits of the type described herein. A cylindrical electrical insulator is located between the springs, both to prevent electrical continuity and also to encourage sliding of one spring relative to the other spring. Such sliding occurs when one spring is heated independently of the other spring.

If representation of a particular braille character requires a specific pin 34 to be in the 34b downward or second position, then controller 14 stops the flow of current through spring 46. As spring 46 cools down, the shape memory metal goes back through its transition temperature and reverts to a martensitic crystalline structure. In the martensitic phase, the shape memory metal has a relatively low yield strength, and a combination of force from spring 44 and weight of the supported assembly causes spring 46 to yield and deform. Pin 34 reverts to the 34b downward position such that the user recognizes the reduction in height of head 36.

In an alternate configuration, front spring 44 could also be fabricated from a shape memory material. This alternate second spring 44' extends when heated above transition temperature, thereby urging pin 34 to the 34b downward position. Second spring 44' is resistively heated, receiving electrical current from controller 14 via circuitry fabricated into member 22 similar to the circuitry of circuit board 28. Electrical connections from the circuitry to alternate front spring 44' provide electrical current, and a connections near midplate 26 provide paths to ground for the current.

Alternate spring 44' is electrically heated to return pin 34 to the 34b downward position. This heating is provided after current is no longer flowing to spring 46 of the same pin 34. Spring 44' extends and reduces the height of spring 46 by causing spring 46 to yield. Once pin 34 is in the 34b position, current can be removed from spring 44', gravity sufficing to keep pin 34 in position.

Controller 14 thus completes circuits through various springs 46 as required to indicate the braille data being transmitted from computer 16. As an alternative to the individual electrical connection from controller 14 to each spring 46, it is also possible for controller 14 to have separate connections to each of the 3 rows and each of the 16 columns, for a total of 19 connections. In this alternative configuration, each spring 46 has 2 electrical connections 49, a connection 49R that it shares with all other springs 46 in the same row, and a connection 49C which it shares with the other two springs in the same column.

In this alternative configuration, controller 14 would strobe current with a limited duty cycle through all rows and columns in a refresh pattern. To activate a particular spring 46, the delay of the duty cycle for the row and column of that spring 46 is changed, such that the transition temperature for the particular spring is exceeded. Other springs along the same row or same column are not affected since none experience the specific increase in duty cycle that the activated spring does.

After the user has read the information displayed, the user can push button 54 which will send a signal to controller 14 that the user is done reading the current information and is ready for the next haptic byte of information. Those of ordinary skill in the art will recognize alternatives to button 54, including by way of example only voice actuated or foot actuated inputs. In addition, button 54 can operate the resetting feature of the supporting mechanism shown in FIGS. 7A–7B. Display 12 also includes cooling fan 56 which removes heat from within display 12. Removal of heat is improved by not enclosing spring 46 within a tube or otherwise impairing the flow of cooling air around spring 46.

In one embodiment of the present invention, display 12 incorporates a large array of pins for reproduction of tactile graphics. In this embodiment, the rate at which a first image is refreshed with a second image is improved by using multiple controllers 14 to control the large array. The large array is subdivided into smaller banks of pins, with each controller 14 controlling the display shown on the particular bank. For example, as many as 6000 pins could be used to represent a standard full page of Braille. This array of pins is subdivided into banks of 100 pins each, and a controller 14 is connected to that bank. The rate of refreshment of some embodiments is also enhanced by including algorithms in software 17 that recognize which pins must change state in transitioning from the first image to the second image, and causing controller 14 to change only those pins.

Figure 9:
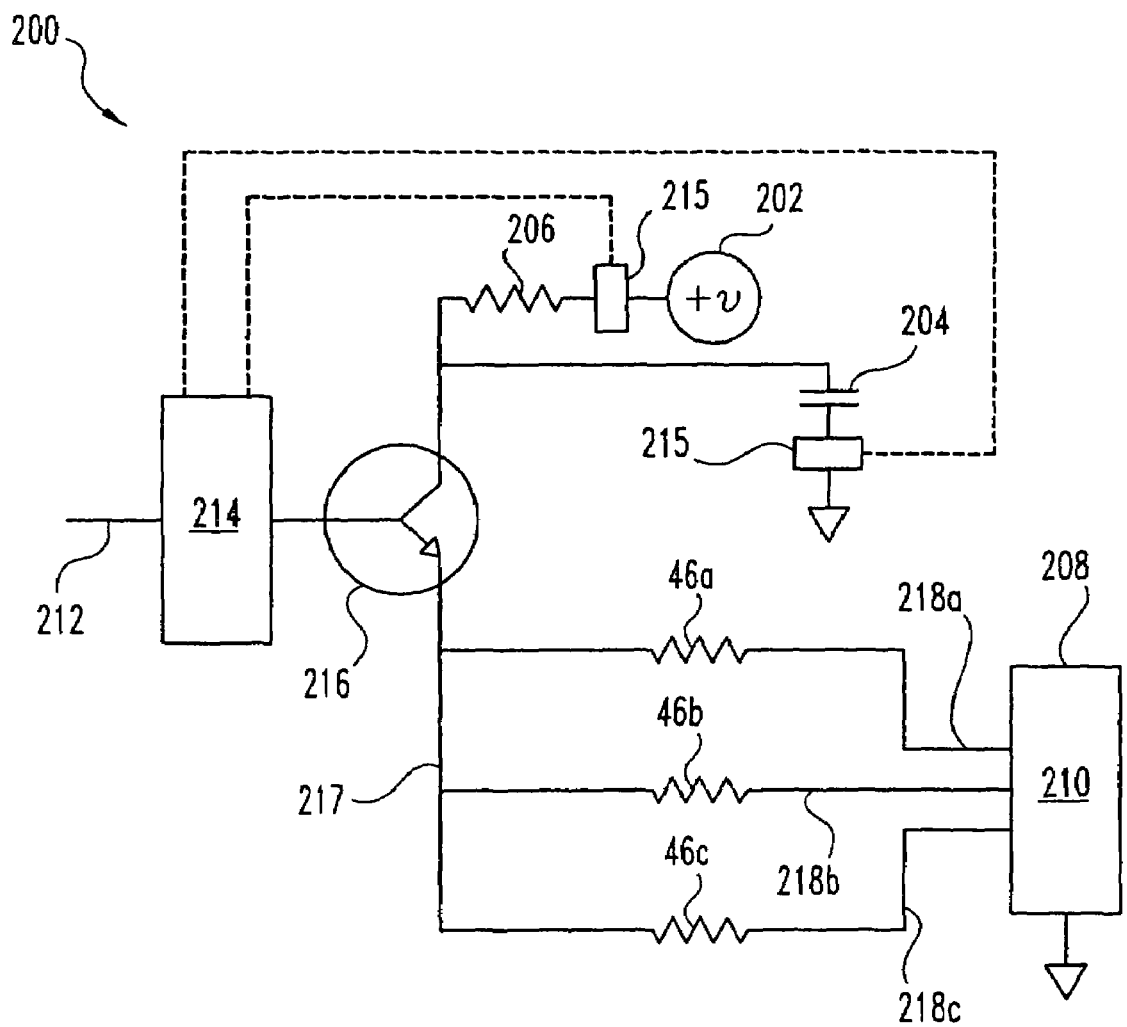
FIG. 9 is a sectional view of a shape memory spring according to one embodiment of the present invention.

Yet another alternative for heating the springs involves the use of a capacitive discharge circuit for quickly heating the springs. FIG. 9 shows a schematic diagram of a circuit 200 that receives inputs via signals 208 and 212 from computer 16 to heat one of springs 46a, 46b, or 46c. In this schematic, springs 46 are springs within a single column, although it is also useful to arrange a row of springs in circuit 200.

Circuit 200 includes a d.c. voltage source 202 that charges capacitor 204 through resistor 206. Source 202 could be a battery, such as a conventional 9 volt battery, or a power supply from computer 16. Capacitor 204 is also connected to the source leg of transistor 216 used in a switching capacity. The drain leg of transistor 216 is connected to each of springs 46a, 46b, and 46c, represented as discrete resistances, via connections 217. The gate of transistor 216 is connected to controller 214, controller 214 accepting input signal 212 from controller 14. Controller 214 is also connected to switches 215 which control the supply of power to resistor 206 and the connection of capacitor 204 to ground. The three springs 46 are connected to multiplexer 210 which selectively connects a spring 46 to ground via the appropriate connection 218 based upon a signal 208 received from computer 16.

As an alternate to the grounding configuration described, it is also useful to connect the multiplexer to ground an entire row at a time. For example, connected in series with spring 46a would be springs 46a', 46a", and other springs 46 of the same row. In this way a single multiplexer would provide ground paths for all pins of the display selectable on a row basis.

Figure 14:
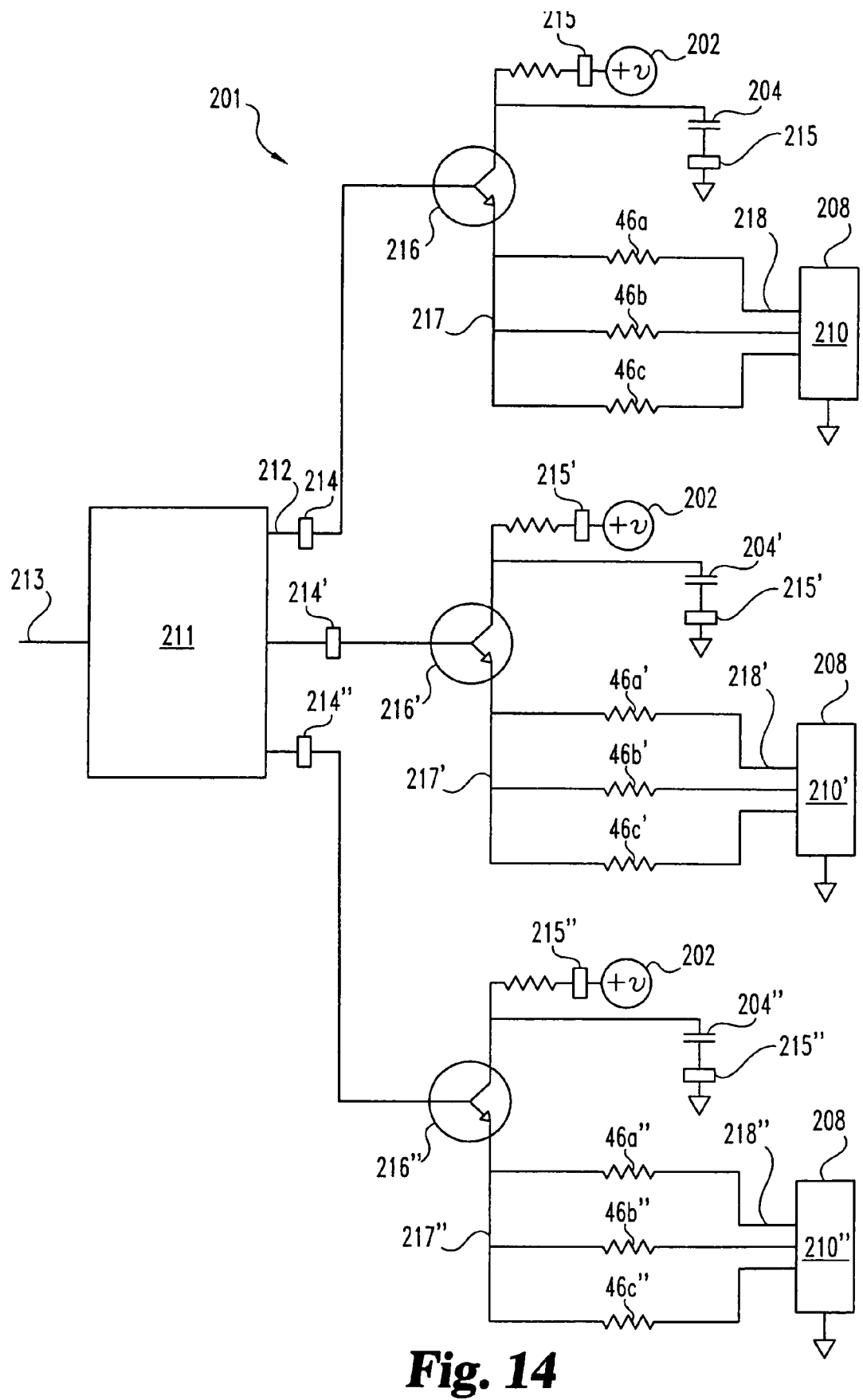
FIG. 14 is a schematic of a circuit according to one embodiment of the present invention.

FIG. 14 shows circuit 201 as an alternative to the configuration shown in FIG. 9. Input signal 213 from controller 14 controls the output of multiplexer 211 which can trigger a plurality of transistors 216, 216', or 216" through controllers 214 in a manner as previously described. Use of multiplexer 211 permits the simultaneous activation of springs 46, 46', or 46". The use of prime and double prime designations can denote additional rows or columns.

Upon receipt of a triggering signal 212 into buffer circuitry 214, transistor 216 is made to connect both capacitor 204 and a divided portion of voltage 202 through the spring 46 whose ground connection has been enabled by multiplexer 210. An R-C circuit is thus formed, and the stored charge of capacitor 204 quickly drains through spring 46. This quick release quickly brings spring 46 above its transition temperature. Since the time constant of the R-C circuit is much less than the effective heat transfer time constant between the spring 46 and its surroundings, most of the energy released by capacitor 204 heats spring 46 only. Spring 46 quickly assumes its predisposed shape.

The heating of the shape memory springs by use of a capacitive discharge circuit permits a reduction in energy consumption and less overall heating of the haptic display as compared to some embodiments of the present invention that use non-capacitive discharge resistance heating of the springs or heating of the springs by a separate resistance heater. The high initial current available with a capacitive discharge provides a higher portion of total energy into heating the spring, with a lower portion of energy being lost as heat conducting, convecting, and radiating into the environment.

As an alternative to resistance heating of spring 46 by directly passing current through spring 46, it is also possible to include a separate heating element in the present invention by placing a small quantity of high-resistance wire, such as a nickel-chromium alloy, proximate to the wire. Current would instead be passed through connections 48 and 50 to this high-resistance wire, which would physically heat spring 46 above the transition temperature.

As an alternative to flexible ground plane connections 50, it is also possible to connect midplate 26 to ground. For example, plate 26 could be coated with a thin layer of conductive material, such as a metallizing layer, which would be connected to ground plane 52. To complete the connection from spring 46 to midplate 26, a thin conductive layer could also be applied to all sides of stop 42 and to a small portion of shaft 38 between stop 40 and stop 42, or to any other nearby components so as to provide electrical continuity. Spring 46 would contact the thin metallizing layer along either shaft 38 or stop 42, which would then conduct into midplate 26. In some embodiments of the present invention it is preferable to utilize a conductive pathway without a separate lead connection, since this lead connection represents additional stiffness and inertia that the shape memory spring must overcome.

Another embodiment of the present invention involves a method and apparatus for shape memory metal springs with variable spring rates. FIGS. 10–13 depict sectional views of shape memory springs or spring assemblies with electrical connections to a power supply, such as 217, 217', 48, or 48', and electrical connections to ground, such as 218 or 52. Connections to 217 or 217' denote connection to separate capacitive discharge power supplies, whereas connections to 48 or 48' denote connection to separate constant heating power supplies. All connections 218 or 52 to ground are separate and selectable from a multiplexer, such as the one depicted in FIG. 9.

FIG. 10 depicts a cross section of a shape memory spring 300 which is electrically divided into sections 302 and 304. Sections 302 and 304 may have a different number of coils per inch. One or more inactive coils 305 may be placed between the different sections 302 and 304. Each section 302 and 304 may be heated independently of the other, or in combination. Section 302 may be heated by providing power to connection 217 and a ground through connection 218d. Section 304 may be heated by providing power to connection 217' and a ground through connection 218e. This provides a total of four different sets of overall spring characteristics achievable by selection of the appropriate electrical circuits. The four different spring characteristics are achieved from the following: neither spring 302 nor 304 heated above transition temperature; both springs 302 and 304 heated above transition temperature; spring 302 only heated above transition temperature; and spring 304 only heated above transition temperature.

The spring characteristics of spring 300, including length and spring stiffness, depend upon the heating applied to the sections. In the case where only section 302 is heated, spring 300 provides a first response; when only section 304 is heated, spring 300 provides a second response; when both sections 302 and 304 are heated, spring 300 provides a third response that is different than either the first or second response. In some embodiments of the present invention sections 302 and 304 are generally the same in terms of outer diameter, pitch, and number of coils. In that case the first response is generally equivalent to the second response.

FIG. 11 depicts a cross section of a shape memory spring 320 which is electrically divided into sections 322 and 324. Sections 322 and 324 are of different outer diameters, and may also have a different number of coils per inch. One or more inactive coils 325 may be placed between the different electrical sections 322 and 322. Each section 322 and 324 may be heated independently of the other, or in combination. Section 322 may be heated by providing power to connection 217 and a ground through connection 218f. Section 324 may be heated by providing power to connection 217' and a ground through connection 218g. This provides a total of 4 different sets of overall spring characteristics achievable by selection of the appropriate electrical circuits.

The spring characteristics of spring 320, including length and spring stiffness, depend upon the heating applied to the sections. In the case where only section 322 is heated, spring 320 provides a first response; when only section 324 is heated, spring 320 provides a second response; when both sections 322 and 324 are heated, spring 320 provides a third response that is different than either the first or second response.

FIG. 12 depicts a cross section of shape memory spring assembly 340 which is electrically and physically divided into springs 342 and 344. Springs 342 and 344 may have a different number of coils per inch. One or more inactive coils 345 are placed between the springs 342 and 344. Springs 342 and 344 may be constrained within a guide tube or by a center post (not shown). A thermally insulating spacer 346 is inserted between the springs 342 and 344. Spacer 346 reduces the flow of heat between springs 342 and 344, thus permitting use of a constant heating source. Each spring 342 and 344 may be heated independently of the other, or in combination. Spring 342 may be heated by providing power to connection 48 and a ground through connection 52a. Spring 344 may be heated by providing power to connection 48' and a ground through connection 52b. This provides a total of 4 different sets of overall spring characteristics for assembly 340 achievable by selection of the appropriate electrical circuits.

The spring characteristics of assembly 340, including length and spring stiffness, depend upon the heating applied to the sections. In the case where only spring 342 is heated, spring assembly 340 provides a first response; when only spring 344 is heated, spring assembly 340 provides a second response; when both springs 342 and 344 are heated, spring assembly 340 provides a third response that is different than either the first or second response. In some embodiments of the present invention springs 342 and 344 are generally the same in terms of outer diameter, pitch, and number of coils. In that case the first response is generally equivalent to the second response.

FIG. 13 depicts a cross section of a shape memory spring assembly 360 which is electrically and physically divided into springs 362 and 364. Springs 362 and 364 are of different outer diameters, and preferably also have a different pitch, or number of coils per inch. One or more inactive coils 365 are placed between the springs 362 and 364. Springs 362 and 364 may be constrained within a guide tube or by a center post (not shown). A thermally insulating spacer 366 is inserted between the springs 362 and 364. Spacer 366 reduces the flow of heat between springs 362 and 364, thus permitting use of a constant heating source. Each spring 362 and 364 may be heated independently of the other, or in combination. Spring 362 may be heated by providing power to connection 48 and a ground through connection 52c. Spring 364 may be heated by providing power to connection 48' and a ground through connection 52d. This provides a total of 4 different sets of overall spring characteristics for assembly 360 achievable by selection of the appropriate electrical circuits.

The spring characteristics of assembly 360, including length and spring stiffness, depend upon the heating applied to the sections. In the case where only spring 362 is heated, spring assembly 360 provides a first response; when only spring 364 is heated, spring assembly 360 provides a second response; when both springs 362 and 364 are heated, spring assembly 360 provides a third response that is different than either the first or second response.

There is an alternative configuration of a shape memory metal spring with a variable spring rate involving the use of concentric springs. A first shape memory metal spring 46 is placed within a second shape memory metal spring 46' with an inner diameter greater than the outer diameter of first spring 46. Each spring 46 and 46' has its own connection to a power supply and its own connection to ground. A thermally and electrically insulating tube separates the outer diameter of first spring 46 from the inner diameter of second spring 46'. A total of 4 different sets of overall spring characteristics for the concentric assembly is achievable by selection of the appropriate electrical circuits.

Another embodiment of the present invention involves a method for preparation of the shape memory springs. One embodiment of this method includes heating the coiled shape memory spring within a fixture to a temperature range for a period of time.

Figure 3:
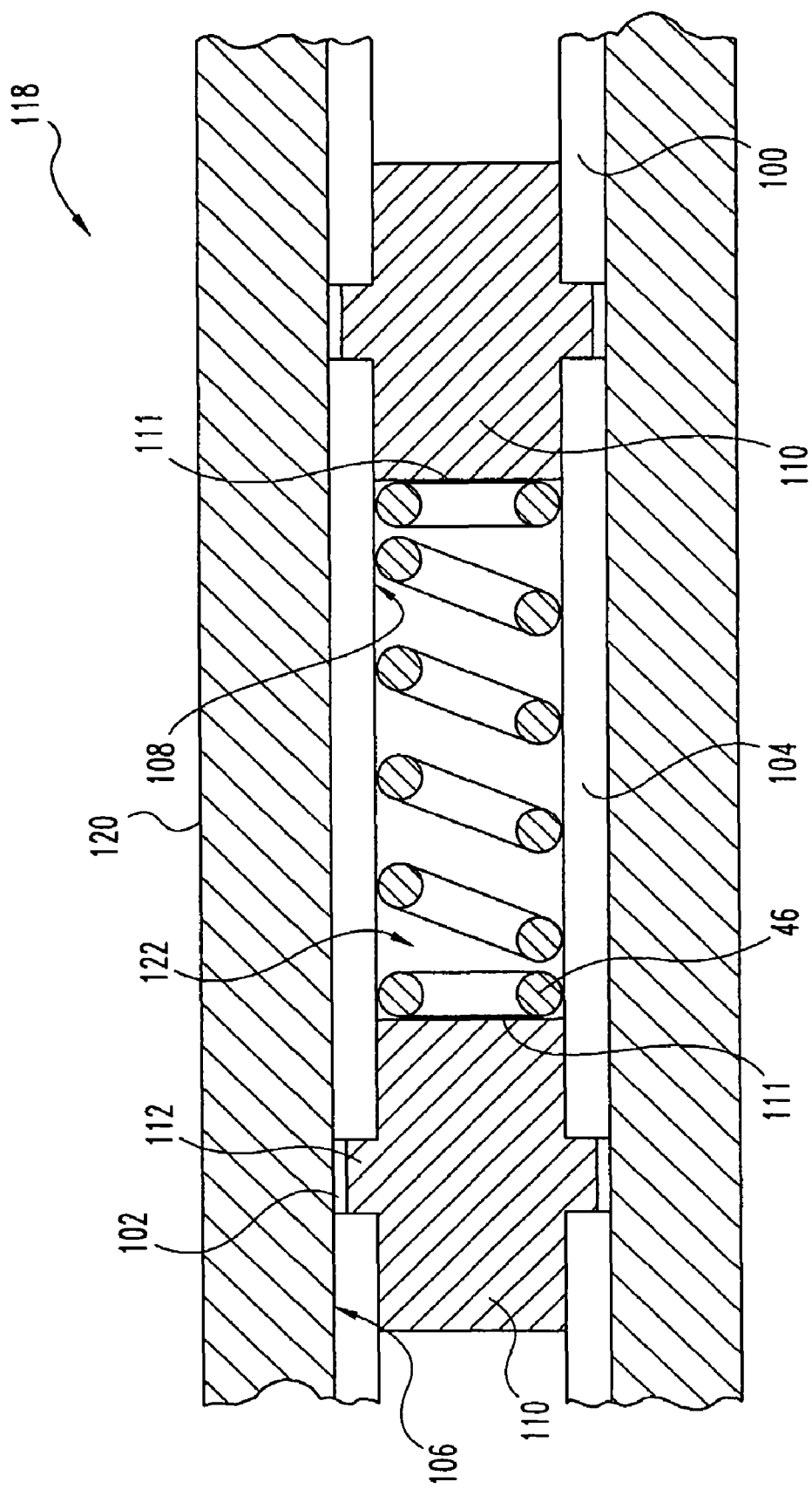
FIG. 3 is a section view of a portion of an apparatus useful for heat treating a shape memory spring according to one embodiment of the present invention.

FIG. 3 shows a cross section of a portion of an assembly 118 for heat treating a shape memory spring 46 according to one embodiment of the present invention. Assembly 118 includes two middle tube sections 100 receiving a plurality of plugs 110 and contained within an outer clamping tube 120. Sections 100 and plugs 110 define a chamber with an inner diameter and a length. The chamber length is longer than the length of the spring, and the chamber inner diameter is greater than the outer diameter of the spring.

Each tube section 100 includes a plurality of semicylindrical cutouts 102 which are roughly perpendicular to central axis 103 of tube section 100. Each tube section 100 is an arc of approximately 180 degrees. Mating surfaces 104 define a plane which also includes axis 103 and the centerlines of cutouts 102. Tube section 100 has an outer diameter 106 and an inner diameter 108. In a more preferred embodiment of the present invention, there are three tube sections 100, each defining an arc of approximately 120 degrees.

Plug 110 has a generally cylindrical shape with outer diameter 116 and opposing faces 111 which are approximately perpendicular to the central axis of diameter 116. Pins 112 with outer diameter 114 protrude on opposing sides of plug 110.

Two plugs 110 are spaced within a first tube section 100*a* by placing pins 112 within cutouts 102. Outer diameter 116 of plugs 110 fits within inner diameter 108 of tube section 100*a*. Faces 111 of the two plugs 110 and inner diameter 108 define a chamber 122 in which a spring 46 is placed. The distance between faces 111 describes a length of chamber 122 which is about equal to the desired length of the final, heat treated spring 46. Inner diameter 108 is about equal to the desired outer diameter of the final, heat treated finished spring 46. In one embodiment the outer diameter of spring 46 as fabricated and before heat treating is about 0.120 inches, and inner diameter 108 is about 0.125 inches.

A non heat treated spring 46 is placed between plugs 110. The wire of spring 46 has been drawn, preferrably annealed, and wound into a coil of approximately the desired final shape and dimensions. A second tube section 100*b* (not shown) is brought into contact with first section 100*a* by aligning cutouts 102 with pins 112 and bringing surfaces 104 into contact. The tube sections 100 containing spring 46 between two plugs 110 is placed within outer clamping tube 120. Tube 120 holds the tube sections 100 in contact with each other in assembly 118. Assembly 118 is placed within a heat treating furnace and heat treated to a preferrable range of about 400 to 600 degrees C. for a preferrable period of between about two minutes and seven minutes. At this temperature spring 46 expands as a result of thermal growth and comes into contact with both faces 111 and diameter 108. In a more preferred embodiment, assembly 118 is placed within a heat treating furnace and heat treated to a preferrable range of about 475 to 500 degrees C. for a preferrable period of between about four minutes and five minutes.

It has been discovered that heat treating a batch of springs in the manner described results in more uniformity in the spring characteristics among the springs of the batch. For example, the standard deviation of the free length of a batch of shape memory springs is reduced by approximately 50% by heat treating in the manner described, as compared to the standard deviation of the same batch as before the heat treat process. This improvement in consistency results in a reduced scrap rate of springs.

There is an alternative to this heat treating method for springs incorporating multiple outer diameters, such as spring 320. In this alternative, each tube section 100 would include a section between faces 111 with a first inner diameter 108 for receiving section 322 and a second inner diameter 108' for receiving section 324. The multiple diameter spring 320 is thus received within a chamber 122' that constrains both sections 322 and 324 of spring 320 during the heat treat process.

In an alternate embodiment of the above described method, spring 46 is not constrained within a chamber but is placed within a heat treating furnace and heat treated to a preferrable range of about 400 to 600 degrees C. for a preferrable period of between about two minutes and seven minutes. At this temperature spring 46 expands as a result of thermal growth and grows to a larger outer diameter and a longer length. It has been found that the outer diameter will increase about 32% to 40% as a result of unconstrained heat treating. It is possible for one of ordinary skill in the art to account for this degree of growth and compensate by fabricating the first, annealed spring to a smaller length and diameter than what is desired for the final spring. In a more preferred embodiment, spring 118 is placed within a heat treating furnace and heat treated to a preferrable range of about 475 to 500 degrees C. for a preferrable period of between about four minutes and five minutes.

The above described methods of heat treating may result in creation of a non-electrically conductive layer upon spring 46, which may include oxides. It is preferreable that this non-conductive layer be removed so as to improve electrical continuity to the spring heating circuit. In one embodiment of the present invention this layer is removed by placing assembly 118 in a furnace which is at a temperature of more than about 900 degrees C. and less than about 1100 C. for a period of less than about 10 seconds. After this heating, assembly 118 is then water quenched. The second heat treating and quenching reduces the bond between the non-conductive layer and the underlying shape memory material, such that the layer is easily brushed off when spring 46 is removed from assembly 118.

In another embodiment the non-conductive layer may be removed by heating the spring in a flame. After the spring is removed from assembly 118, it may then be put in a fuel rich flame for more than about one second and less than about five seconds. In one embodiment the flame is a fuel rich butane flame. After this flame heating, the non-conductive layer may be easily brushed off. In a more preferred method, the spring is water quenched after the flame heating.

FIGS. 4A–4E depict depict an embodiment of the present invention that provide for mechanically holding pin 34 in the 34*a* upward position without need for continued heating of spring 46. This supporting mechanism 399 is similar in some respects to the ratcheting mechanism that holds the inked aperture of a push button ball point pen in the extended position.

Figure 4A:
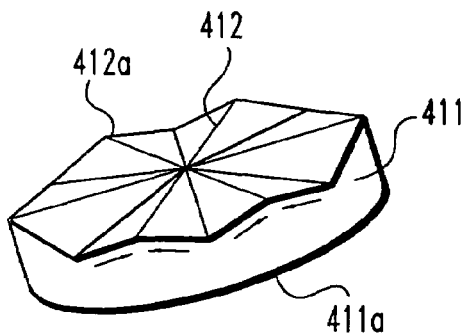
FIG. 4A is a side perspective view of a portion of an element of a supporting mechanism.

FIG. 4A is a side and top perspective view of a portion of a supporting mechanism. A contact member 411 is shown in FIG. 4A. Underside contact surface 411a is in contact with and is urged in the first direction toward the first position by shape memory spring 46. A plurality of teeth 412 are located on the surface of member 411 opposite of contact surface 411a.

Figure 4B:
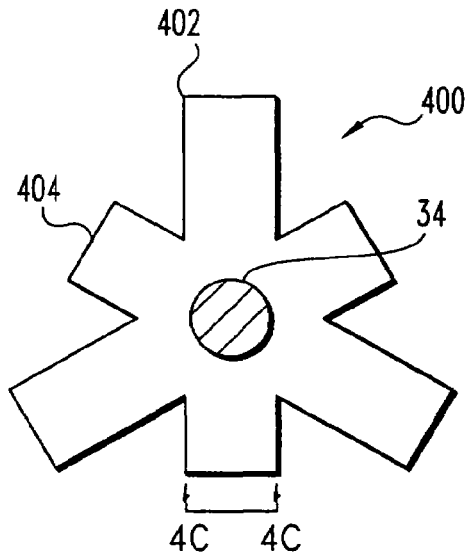
FIG. 4B is a top view of a portion of an element of a supporting mechanism.
Figure 4C:
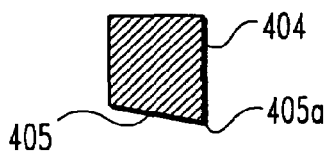
FIG. 4C is a side diagrammatic view of the element of FIG. 4B as taken along line 4C—4C of FIG. 4B.

FIG. 4B is a top view of an element of a supporting mechanism. A spoked member 400 is shown in FIG. 4B. Spoked member 400 may include pin 34 integrally as shown, or may push against a contact surface of a separate pin 34. Spoked member 400 preferably includes three equally spaced long sections 402 and three short sections 404 which are radially intermixed as shown. Each short section 404 includes a tooth 405 as best seen in FIG. 4C. FIG. 4C is a side diagrammatic view of short section 404 as seen from line 4C—4C of FIG. 4B. Spoked member 400 is located intermediate of pin 34 and contact member 411. Long spokes 402 also include an underside toothed surface (not shown) similar to surface 405 of short section 404.

Figure 4D:
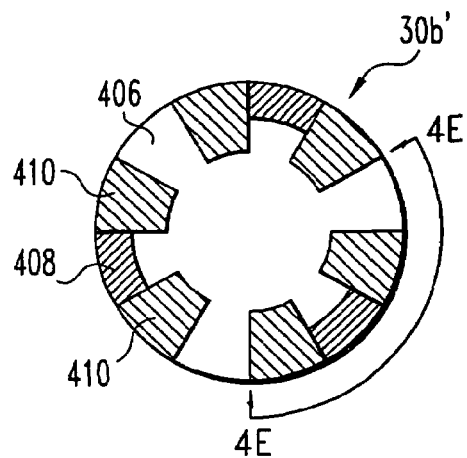
FIG. 4D is a top view of an element of a support mechanism.

FIG. 4D is a top view of an element of a support mechanism. Hole 30b' as defined within member 26 is shown from a top view in FIG. 4D. Arranged around the periphery of hole 30b' is an alternating pattern of slots 406, rests 408, and guiding surfaces 410. The arrangement of rests, slots, and guiding surfaces are adapted and configured to accept spoked member 400.

Figure 4E:
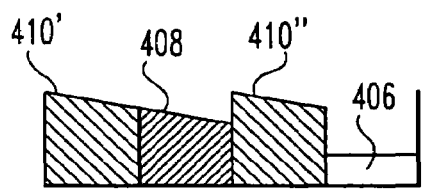
FIG. 4E is a linear view of the element of FIG. 4D as taken along arc 4E—4E of FIG. 4D.

FIG. 4E is a linear view of the element of FIG. 4D as taken along arc 4E—4E of FIG. 4D. A guiding surface 410 is located on either side of first rest 408. The surface of rest 408 and guiding surface 410 are shaped so as to permit sliding contact with a long section 402 of spoked member 400.

When pin 34 is in the downward position, each of the three long sections 402 of spoked member 400 are within one of the channels 406 arranged around hole 30b. Contact member 411 is spaced apart from the underside teeth 405 of spoked member 400. When spaced apart, vertices 412a of teeth 412 are circumferentially offset from vertices 405a of teeth 405. In response to upward urging by spring 46, contact member 411 comes into contact with short sections 404, urging spoked member 400 and pin 34 in the first direction toward the first position, and rotating spoked member 400 as teeth 405 slide along teeth 412. Spoked member 400 is urged upward within slot 406, and because of the rotation imparted by contact member 411 spoked member 400 rotates to a position where a long section 402 is located above guiding surface 410'.

As spring 46 cools, spring 44 urges pin 34 and spoked member 400 in a second direction generally opposite the first direction, with the angled undersurface of long section 402 coming into contact with guiding surface 410'. Since the undersurface of long section 402 is angled in a complementary manner to guiding surface 410', long section 402 continues to rotate in sliding contact with guiding surface 410' and finally is supported within rest 408. As spring 46 continues to cool, vertices 412a come out of contact with short sections 404. Vertices 405a are again spaced to be above a sloping portion of teeth 412.

In response to a second heating of spring 46, contact member 411 again urges spoked member 400 upward and also rotates spoked member 400. Long section 402 is now above guiding surface 410". As spring 46 cools, long section 402 is brought into sliding contact with guiding surface 410". As a result of the complimentary angles of both guiding surface 410" and the underside of long section 402, spoked member 400 rotates as it is urged in the second direction until long section 402 falls within channel 406.

Figure 5:
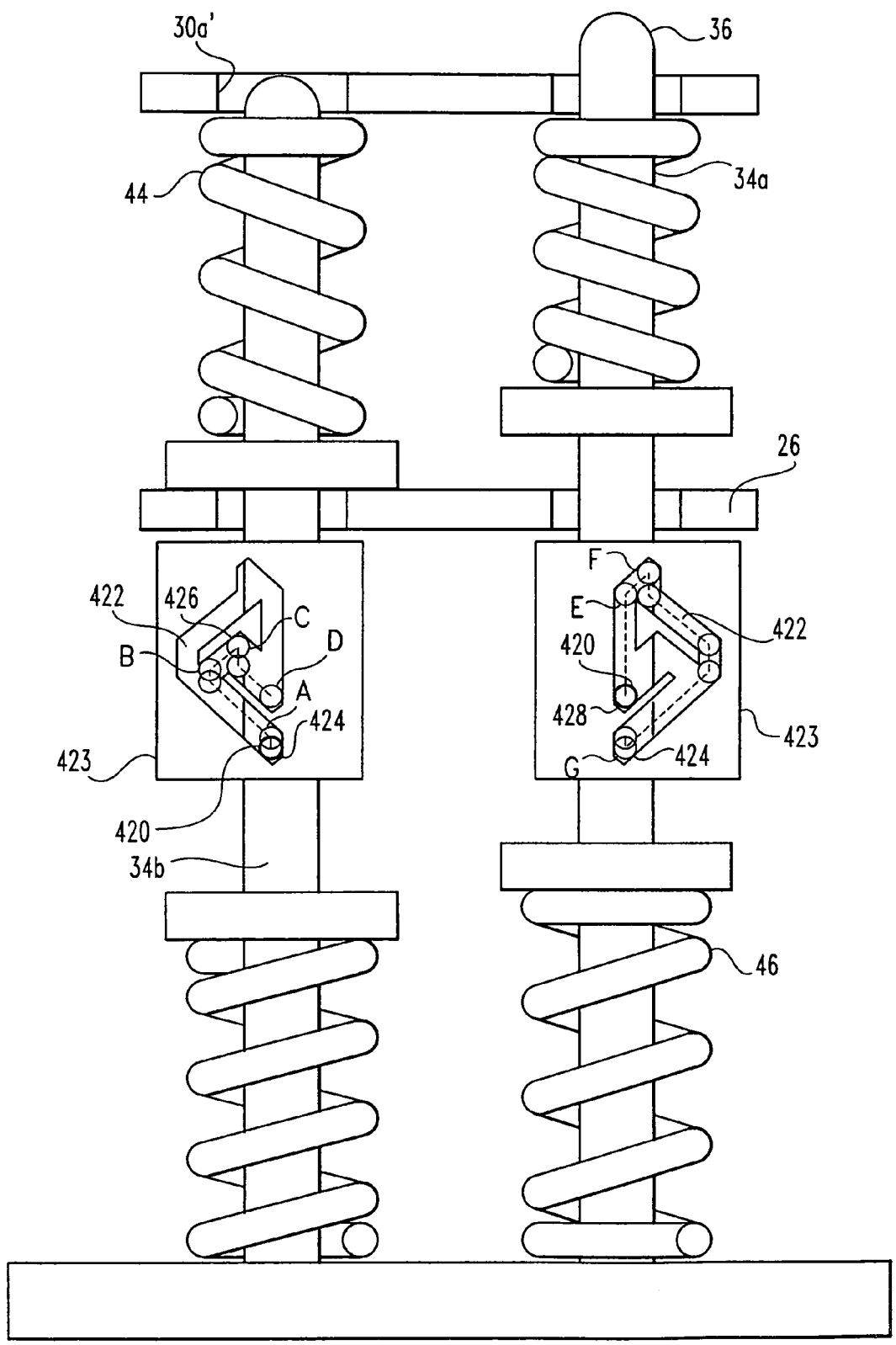
FIG. 5 is a diagrammatic side view of a pin and supporting mechanism according to one embodiment of the present invention.

FIG. 5 is a diagrammatic side view of a pin and supporting or ratcheting mechanism 419 according to another embodiment of the present invention. FIG. 5 depicts pins supported in the 34a first or upward position and the 34b second or downward position by a supporting mechanism. A pin 34b is shown in the second position. A projection 420 extends from the side of pin 34b at a location intermediate of the two ends of the pin. Projection 420 is able to slide within a guide slot 422 defined within member 424. Member 424 is preferrably attached to midplate member 26. Pin 34b is shown being supported in the second position by projection 420 being located within second rest 424 of slot 422. In response to a first heating of first spring 46 by a heater (not shown in FIG. 5), pin 34 is urged in a first direction toward the upward or first position. The movement of pin 34 is guided by the movement of projection 420 within slot 422. Upon urging by first spring 46, projection 420 will move from second rest 424 to position A within slot 422. Projection 420 will then traverse within slot 422 toward position B and finally to position C. At position C, any further upward movement of pin 34 is restrained by the capture of projection 420 within third rest 426. As first spring 46 is permitted to cool, second spring 44 will urge pin 34 and thus projection 420 toward the second position. Projection 420 will continue to follow guide slot 422, and is then supported within first rest 428 of member 424. Pin 34 is thus supported in the upward or first position by projection 420 within first rest 428. Touching of pinhead 36 by a user results in axial load that is reacted by projection 420 within first rest 428.

Now referring to the right hand side of FIG. 5, pin 34 is shown in the first position. In response to a second heating of spring 46 by a heater (not shown), pin 34 and projection 420 are urged upward and away from first rest 428. Projection 420 is guided by slot 422 to positions E and subsequently F. As first spring 46 is permitted to cool, pin 34 is urged by spring 44 downward or toward the second position. Projection 420 continues to be guided within slot 422 and ultimately is supported by second rest 424 of member 423 as shown by position G.

Guide slot 422 includes a degree of lateral movement as well as vertical movement. In some embodiments of the present invention holes 30 are enlarged so as to permit lateral movement of pin 34. In other embodiments, member 423 may be permitted to float laterally relative to the pin.

Figure 6:
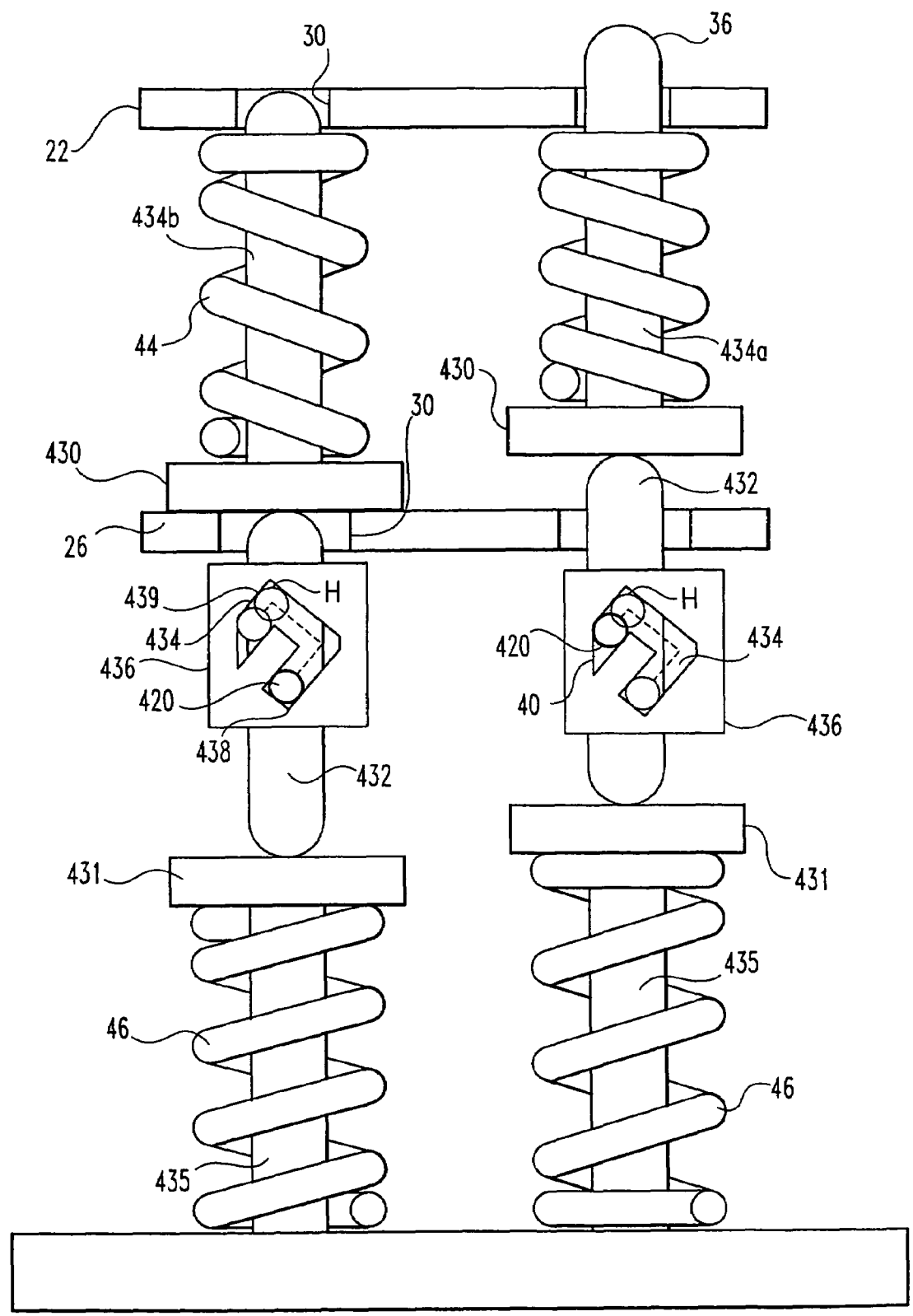
FIG. 6 is a diagrammatic side view of a pin and supporting mechanism according to one embodiment of the present invention.

FIG. 6 is a diagrammatic side view of a pin and supporting or ratcheting mechanism 429 according to one embodiment of the present invention. In FIG. 6 a pin is depicted in the first or upward position supported by a supporting mechanism, and a pin is depicted in the second or downward position preferably supported by a supporting mechanism. A pin 434b is shown in the second position and a pin 434a is shown in the first position. Pin 434 includes a pinhead 36 at one end suitable for being touched by a user and a contact member 430 at the other end. Second spring 44 is preferrably aligned axially with a cylindrical section of pin 434, and is preferably retained between one side of contact member 430 and one side of plate member 22. First spring 46 fabricated from a shape memory material is axially aligned with the cylindrical section of a spring guide 435. Spring guide 435 is movable between a first position and a second position along an axial direction. Heating of spring 46 by a heater (not shown in FIG. 6) urges contact member 431 of spring guide 435 upward or in the direction toward the first position as depicted by pin 434a.

Located between pin 434 and spring guide 435 is intermediate pin 432. Intermediate pin 432 transmits spring loads from either of springs 44 or 46 and preferably includes rounded ends for reduced friction and improved alignment between the ends of pin 432 and the contacting surfaces of contact members 430 and 431. In some embodiments of the present invention the contact surface of member 430 or 431 in contact with pin 432 may be slightly concave so as to assist in centering of pin 432. Pin 432 includes a projection 420 extending from the side of pin 420 at a location intermediate of the two ends of the pin. Projection 420 is able to slide within a guide slot 434 defined within member 436. Member 436 is preferably attached to midplate member 26. Projection 420 is shown as having a cylindrical shape, but may have different shapes that are compatible with sliding and being supported within the slot.

As shown on the left side of FIG. 6, pin 434b is shown being supported in the second position by projection 420 which is located within second rest 438 of slot 434. In response to a first heating of first spring 46 by a heater (not shown), spring guide 435, pin 432, and pin 434 are urged in a first direction toward the upward or first position. The movement of pin 432 is guided by the movement of projection 420 within slot 434. Upon urging by first spring 46, projection 420 will move from second rest 438 to position H within slot 434. At position H, any further upward movement of pin 432 is restrained by the capture of projection 420 within third rest 439. As first spring 436 cools, second spring 44 urges pin 434, pin 432, and spring guide 435 in a second direction toward the second position. Projection 420 continues to follow guide slot 434, and is then supported within first rest 440 of member 436. Pin 434 is thus supported in the upward or first position by projection 420 within first rest 440. Touching of pinhead 36 by a user results in axial load that is reacted by projection 420 within first rest 440.

Now referring to the right hand side of FIG. 6, pin 434 is shown in the first position. In response to a second heating of spring 46 by a heater, pin 434, pin 432, and spring guide 435 are urged upward in the first direction and away from first rest 440. Projection 420 is guided by slot 434 to position H. As first spring 46 is permitted to cool, pin 434, pin 432, and spring guide 435 are urged downward or toward the second position by spring 44. Projection 420 continues to be guided within slot 434 and ultimately is supported by second rest 438 of member 436.

Guide slot 434 includes a degree of lateral movement as well as vertical movement. In some embodiments of the present invention holes 30 are enlarged so as to permit lateral movement of pins 434 or 432. In other embodiments, member 436 may be permitted to float laterally relative to the pins.

Figure 7A:
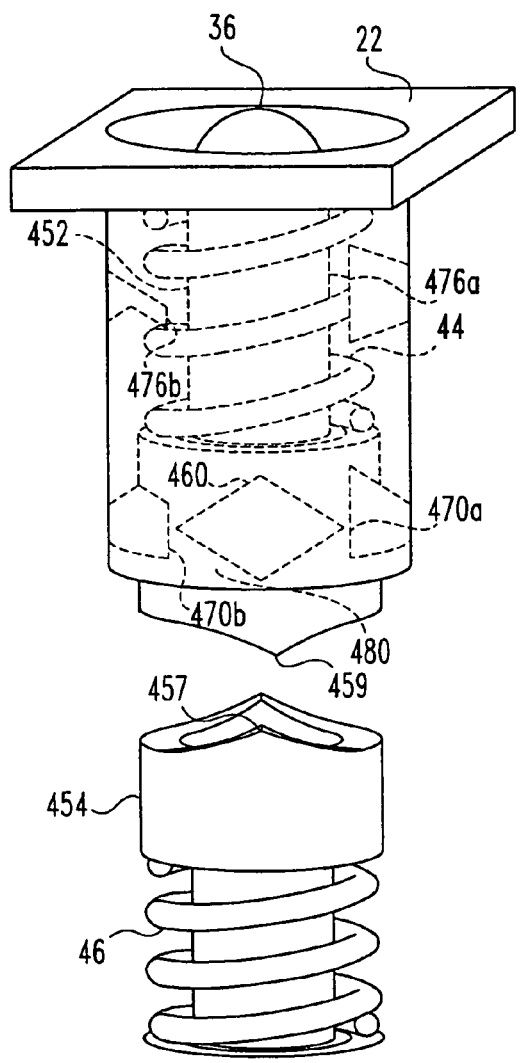
FIG. 7A is a diagrammatic side view of a pin and supporting mechanism according to one embodiment of the present invention.
Figure 7B:
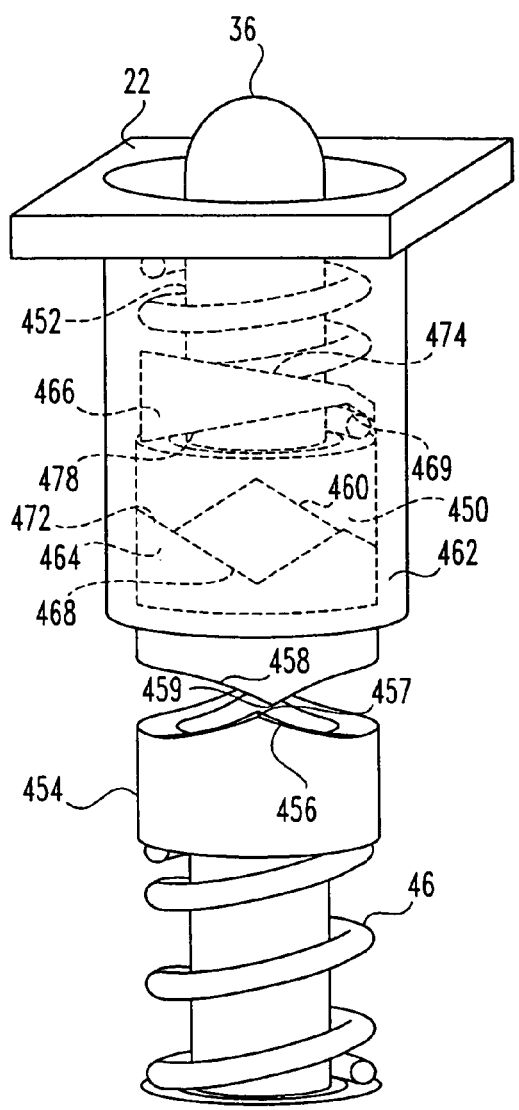
FIG. 7B is a diagrammatic side view of a pin and supporting mechanism according to one embodiment of the present invention.

FIG. 7A is a diagrammatic side view of a pin and supporting mechanism 449 according to one embodiment of the present invention. FIG. 7B is a diagrammatic side view of a pin and supporting mechanism according to one embodiment of the present invention. In FIG. 7A pins are depicted in the first or upward position supported by a supporting mechanism, and in FIG. 7B the pins are depicted in the second or downward position.

An intermediate pin 450 is located intermediate of a top pin 452 and a bottom pin 454. Bottom pin 454 preferably includes a contact surface along which pin 454 is urged in the first direction by shape memory spring 46. Top Pin 452 includes a pinhead 36 and extends beyond the top surface of top plate 22 when in the first postiion. Pin 452 is preferably situated within spring 44 and is urged in a direction generally opposite of the first direction. Pins 450, 452, and 454 are in contact, such preferably all three pins are urged in a direction by either of springs 44 or 46.

One end of bottom pin 454 includes a plurality of teeth 456 which are engageable with a plurality of teeth 458 on one end of intermediate pin 450. There are preferably at least two teeth 456 on opposing sides of pin 454, and more preferably at least two teeth 458 on opposing sides of pin 450. Teeth 456 and 458 include vertices 457 and 459, respectively. In a more preferred embodiment of the present invention, there are three engageable teeth on each of pins 454 and 450. For sake of clarity, only two teeth are shown in FIGS. 7A and 7B.

Intermediate pin 450 includes a projection 460 on an outer surface of the pin. In one embodiment of the present invention, projection 460 is generally diamond-shaped, although other shapes of projection 460 are contemplated by the present invention, such alternative projections being slidingly compatible with the guiding surfaces to be described and fittingly compatible with the first rest to be described.

Pin 450 fits within a generally cylindrical member 462. Member 462 is preferably a separate molded cylindrical component attached to midplate member 26. Member 462 includes projecting inward from its inner cylindrical surface a lower guide 464 and an upper guide 466. Member 462 includes at least two guides 464 and two guides 466, and preferably three guides 464 and three guides 466. In some embodiments of the present invention, pin 452 and spring 44 also fit within member 462, although the present invention contemplates embodiments in which only pin 450 is within member 462.

Lower guide 464 includes a first rest for supporting projection 460. Upper guide 466 includes a second rest 469 for restraining movement of projection 460 in the first direction away from first rest 468. Lower guide 464 includes a pair of vertical edges 470a and 470b on either end of a first guiding surface 472. Upper guide 466 includes a pair of vertical edges 476a dna 476b on either end of a second guiding surface 474 and a third guiding surface 478. Vertical edges 470 and 476 define a channel 480 which is wider than projection 460, and through which projection 460 is slidable. There are at least two channels 480 along the inner surface of member 462, and preferably three channels 480. Guiding surfaces 472, 474, and 478 are adapted for sliding contact with projection 460.

The preferred embodiment of supporting mechanism depicted in FIGS. 7A and 7B is useful with a spring 46 that can be heated to two different levels of temperature, and thus two different amounts of spring force, by a heater (not shown) or by resistive heating. The heater should be capable of applying a first amount of heat to spring 46 and a second amount of heat to spring 46, the second amount being greater than the first amount. By way of example, if heated by theremoelectric generators, the second amount of heat results by applying current to the heater for a longer period of time than for the first amount of heat. For another example for the case of resistive heating, the second amount of heat results by applying more current to spring 46 or to a separate resistive heater than for the first amount of heat. Those of ordinary skill in the art will recognize other suitable methods for applying different amounts of heat to spring 46.

As shown in FIG. 7A, pins 452, 450, and 454 are shown in the downward or second position. Vertices 457 of teeth 456 are in contact with the sloping portion of teeth 458. Vertices 459 of teeth 458 are in contact with the sloping portion of teeth 456. In response to heating of first spring 46 by a first amount of heat, pin 454 pushes pins 450 and 452 in a first direction toward the first position. Teeth 456 engage with teeth 458 and impart rotation to pin 450. The movement of pin 450 in the first direction is guided by projection 460 within the first channel 480. As projection 460 moves past the upper edge of lower guide 464, the rotation imparted to pin 450 causes projection 460 to move between lower guide 464 and upper guide 466. As spring 46 cools, pin 460 and projection 460 are urged in the second direction by second spring 44. Projection 460 slidingly engages first guiding surface 472 and is supported within first rest 468 of guide 464, as shown in FIG. 7B. Vertices 457 and 459 are again aligned with the sloping portion of the opposing teeth.

In response to heating of spring 46 by the first amount of heat, projection 460 is urged toward third guiding surface of upper guide 466. As a result of rotation imparted to pin 450 by teeth 456 of pin 454, projection 460 moves toward and is restrained by second rest 469. Upon cooling of spring 46, projection 460 is urged downward by spring 44, slides along lower guide 464, and into a second channel 480 of member 462.

Again referring to FIG. 7A, in response to heating of spring 46 by a second, greater amount of heat pin 450 and projection 460 again move in the first direction toward the first position. However, because of the greater force imparted to pin 450, projection 460 does not rotate and slide between guides 464 and 466, but rather continues past upper guide 466 to a position above the uppermost part of vertical edge 476a. As spring 46 cools, projection 460 is urged downward by spring 44 and slides along second guiding surface 474. Since there is no rest position along surface 474, projection 460 continues to slide and moves into the second channel 480.

Application of the second amount of heat to spring 46 when pins 452, 450, and 454 are in the first position as shown in FIG. 7B also results in movement of projection 460 from first rest 468 toward second rest 469. Upon cooling, projection 460 moves into channel 480.

The second amount of heat and increased level of spring force from spring 46 is thus able to permit a general resetting of pins 452 to a channel 480. Regardless of whether the projection is within a channel or being supported in the first position, application of the second amount of heat results in movement of projection 460 in a channel 480. This is useful for assemblies controlled by a processor. With other types of supporting mechanisms described herein, a reset of a pin to the downward position is accomplished by a second actuation if the pin is already in the first position. When controlled by a processor, the processor should thus remember the position of a pin in order to determine whether or not an actuation signal is required. In the embodiment of reset mechanism shown in FIGS. 7A and 7B, the processor need not remember the position of the pins, and may apply the second amount of heat to effect a reset. Thus, processor controlled operation of a braille display, for example, requires less processor memory and time. The variable springs described herein, some of which are depicted in FIGS. 10–13, are especially useful with the supporting mechanism described above and depicted in FIGS. 7A–7B. The first amount of heat is applied to one portion of the spring, resulting in a first spring force sufficient to push projection 460 onto guiding surface 472. The second amount of heat includes heating both portion of the variable spring, resulting in a second spring force sufficient to push projection 460 onto guiding surface 474.

Although various embodiments of supporting mechanisms have been described herein, those of ordinary skill in the art will recognize many equivalents to these supporting mechanisms that are also useful in the present invention. Also, those of ordinary skill in the art will recognize various ways in which to incorporate stops in the various supporting mechanisms to limit the upward or downward travel of the pins.

The use of the various embodiments of supporting mechanisms permit continued support of pin 34 or 434 in the upward position without need for continued heating of spring 46, and also permits pin 34 or 434 to resist larger axial loads that could otherwise be supported by spring 46. Axial loads along pin 34 or 434 can be transmitted into midplate 26 by use of this supporting mechanism. The ability to support higher axial loads enhances the ability of pins 34 or 434 to emboss a surface presented to the top side of top plate 22.

Figure 8:
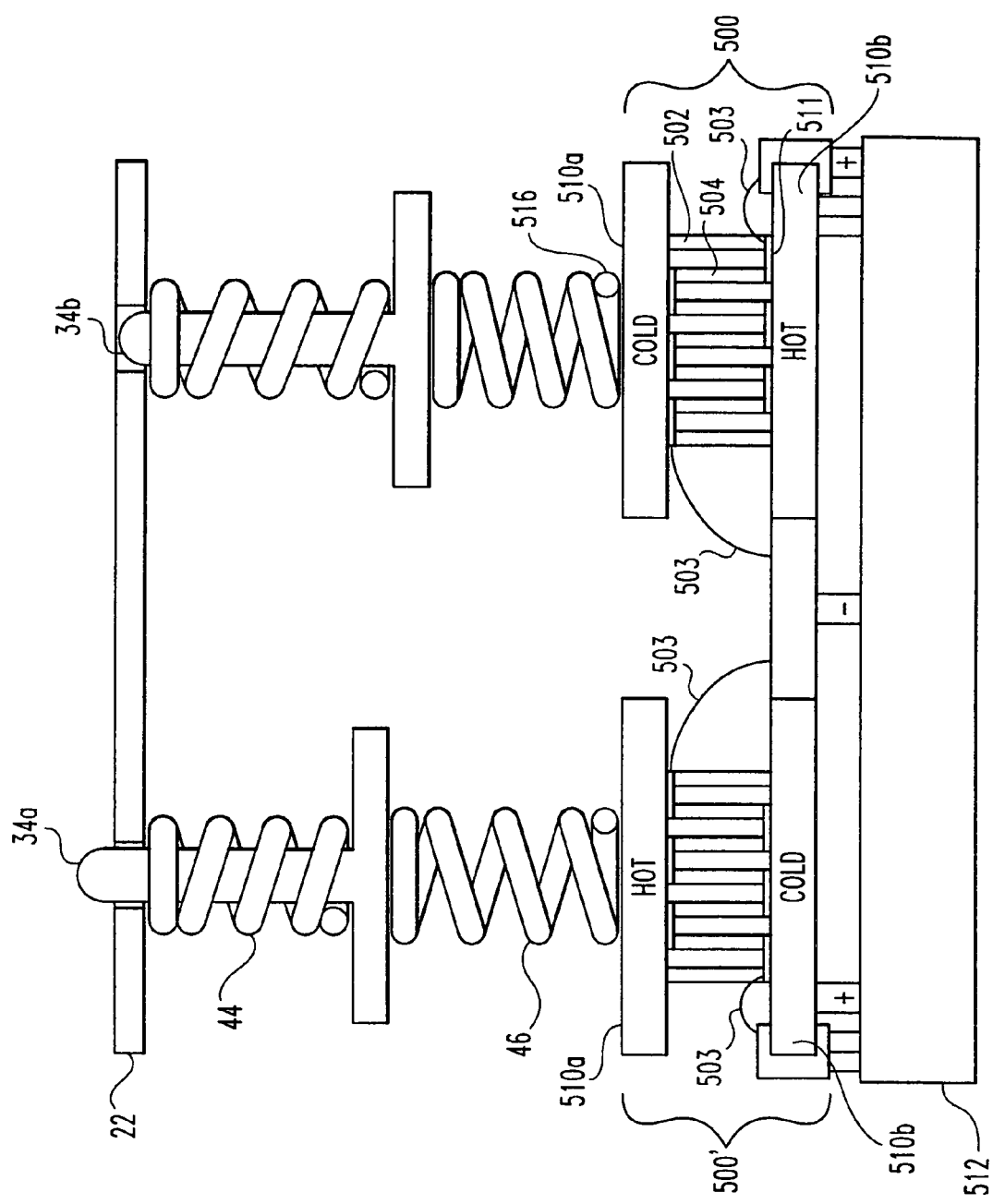
FIG. 8 is a diagrammatic and schematic side view of a thermoelectric element according to one embodiment of the present invention.

FIG. 8 depicts diagrammatically an alternate heating element useful with the present invention. Thermoelectric element 500 is shown schematically in a side view. Thermoelectric heaters (and coolers) utilize the Peltier effect to act as a solid-state heat pump with no moving parts or fluid reservoir. The Peltier effect is a physical phenomenon that occurs between a semiconductor junction of a p-type semiconductor 502 and an n-type semiconductor 504. When current flows across the junction, electrons travel from the low-energy state in the n-type semiconductor to the high-energy state in the p-type semiconductor. This requires energy, which is absorbed from the surroundings, making a cool surface at the junction. Reversing the current makes the junction get hot. Typically, bismuth telluride junctions are placed as in FIG. 21 to create cold and hot surfaces. Thermoelectric elements 500 such as in FIG. 21 are commercially available in sizes as small as 1.8 mm×3.4 mm, including by way of example only the OptoTEC (™) brand thermoelectric module assemblies, which are useful in a braille-cell matrix or shaped memory spring actuator as shown in FIG. 8.

As shown on the left side of FIG. 8, a pin 34 is shown in the 34a first position. Pin 34 is in the first position in response to heating of memory spring 46 by thermal conductor 510a of thermoelectric heater 500'. Heater 500' is being supplied with power from interface controller 512 such that thermal conductor 510a is hot and thermal conductor 510b is cool. Although spring 46 may be permitted to cool by removing power to thermoelectric heater 500', it is also possible to actively cool memory spring 46. Pin 34 shown on the right side of FIG. 8 is shown in the 34b downward position after spring 46 has been actively cooled by thermoelectric heater 500. Control circuitry 512 includes a polarity inverter that permits a reversing of electrical polarity to lead wires 503 such that thermal conductor 510a of heater 500 is actively cooled, rejecting heat to thermal conductor 510b. One advantage of this technique is that by simply reversing the polarity of the thermoelectric heater 500, one can actively cool the spring as well, thus reducing the lag time to allow the spring and pin to return to the un-actuated state.

The present invention contemplates heating memory spring 46 either by resistive heating or by thermoelectric heating. In one embodiment of the present invention, the resistive process used 12 V and 0.5 A over 0.2 sec in order to actuate the spring. This input produced a power of $P=VI=6$ W, and thus work $W=Pt=1.2$ J. In an embodiment of the present invention utilizing thermoelectric heating, the same actuation can be achieved with 0.5 V and 0.2 A. This results in an input power of only $P=VI=0.100$ J or about a factor of 12 times less than the resistive heating. According to an equation provided by one thermoelectric element manufacturer, the heat produced by the hot side of element 500 (and subsequently available to the spring) is approximately 0.066 Joules (to effect a sufficient movement of the spring). Using 66 millijoules (mJ) as the estimate for the amount of power required to actuate the spring, the efficiency of a thermoelectric heater 500 for heating the spring is on the order of ($P_{OUT}/P_{IN}$=66 mJ/100 mJ) about 66%, whereas the efficiency of the resistive heating process is on the order of (66 mJ/1.2 J) about 6%. Thus element 500 is more efficient than the resistive heating technique.

Use of a thermoelectric heater permits the use of modular braille cells for applications such as ATM machines. Since the currents required by the thermoelectric heater are small, a standard 14-pin integrated circuit multiplex chip can be used to control the actuation of the eight pins, with three leads reserved for data input as a three-digit binary number. This IC braille cell could be plugged in along with other cells into a motherboard, and bad cells could be easily swapped for new ones.

The embodiments of the present invention incorporating thermoelectric heating are useful with the other features of the present invention heretofore described and depicted. Some embodiments of the present invention also contemplate a supporting mechanism similar to those found in ball points pens or similar to those previously described, but modifiying the supporting mechanism so that it can hold any or all of the pins in the up position with no power to the springs. One device is sufficient for all eight of the pins, with a second spring-loaded device for release (reset) of the pins. Although this would increase the total number of springs to nine for the cell, the power would be needed only for switching states. The present invention also contemplates another means for supporting that utilizes a supporting mechanism similar to that found in mechanical pencils. With this alternate means for supporting, the pin is extended to a greater height each time spring 46 is exposed to another heating cycle.

Periodic D.C. signals can be used with a thermoelectric heater like a thermostat to keep a spring in the raised position. Each pin in the cell would be a part of the cycle of signals sent to the IC. As any particular raised spring started to cool, a reinforcement pulse could be sent to heat it again. Pins in the lower state would simply be passed over. For embodiments like this without mechanical ratchet or support, the cooling effect of the thermoelectric element could be used by reversing polarity by use of a polarity inverter, thus snapping the spring back down quickly into its lowered position. Tests with this embodiment have shown that this effect can be utilized to make the spring actuator function like a solenoid.

Figure 15:
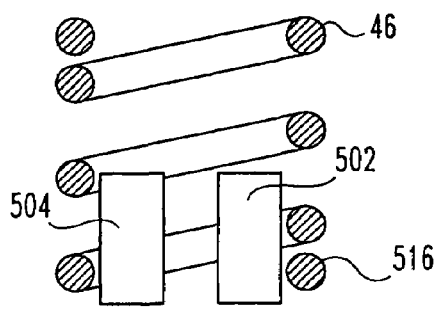
FIG. 15 is a cross-sectional diagrammatic representation of a shape memory spring and a thermoelectric heater.

FIG. 8 depicts a configuration of thermoelectric heater and spring wherein the thermal conductor 510 of element 500 is in contact with the bottom inactive coil 516 of spring 46. However, the present invention contemplates additional heater configurations in which the thermoelectric element is proximate to the shape memory spring so as to provide improved heat transfer into the spring and improved packaging of the spring and heater element combination. FIG. 15 shows a cross-sectional view of a portion of a shape memory spring 46 with portions of the thermoelectric heater. Semiconductors 502 and 504 are configured and adapted to the located proximate to one end of spring 46. Semiconductors 502 and 504 are in electrical contact with a coil of spring 46 such as inactive coil 516. Electrical power from a power supply (not shown) is passed by lead wires (not shown) into semiconductors 502 and 504. A coil spring 46 acts as a conductor between the semiconductors. This configuration provides not only thermoelectric heating of spring 46, but also resistive heating of spring 46 through the conducting coil.

Figure 16:
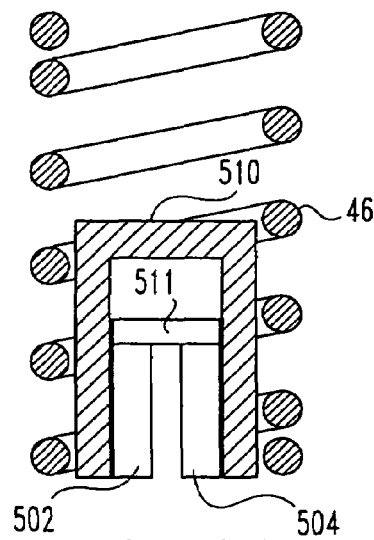
FIG. 16 is a cross-sectional diagrammatic representation of a shape memory spring and a thermoelectric heater.

FIG. 16 shows a cross-sectional view of a portion of a shape memory spring with a thermoelectric element located therein. This configuration is similar to that shown in FIG. 15, except that thermally conductive layer 510 is located between the semiconductors and the coils of the shape memory spring. Thermally conductive layer 510 is also an electrical insulator, so that no current is passed through the spring. The portion of layer 510 is captured within an inactive coil at one end of the spring.

Figure 17:
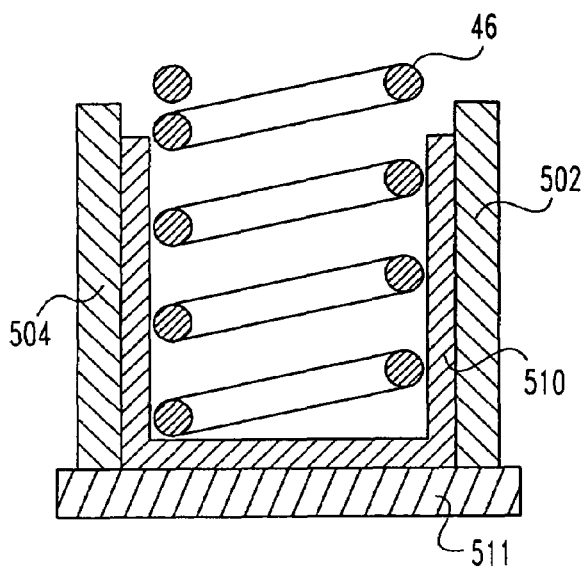
FIG. 17 is a cross-sectional diagrammatic representation of a shape memory spring and a thermoelectric heater.

FIG. 17 shows a diagrammatic cross-section of a thermoelectric heater that surrounds a portion of the outer diameter of the shape memory spring. Semiconductors 502 and 504 are located on either side of spring 46. Between the semiconductors and the spring is a thermally conductive layer 510.

Figure 18:
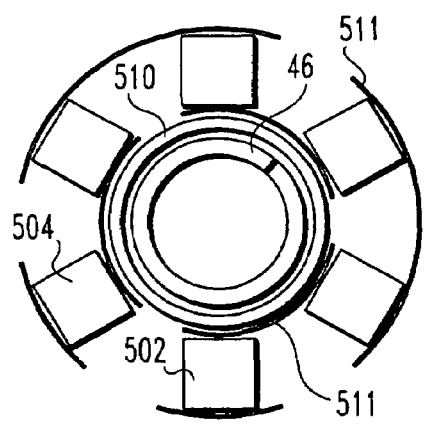
FIG. 18 is a diagrammatic top view of an arrangement of a shape memory spring and thermoelectric heater.

FIG. 18 is a top diagrammatic view of portion of a shape memory spring surrounded by a plurality of semiconductor junctions 502 and 504. Semiconductors 502 and 504 are electrically linked by electrically conductive layers 511. A thermally conductive layer 510 is placed between the inner diameter of the semiconductors and the spring. Spring 46 is thus heated uniformly circumferentially with or without contacting any coils of the spring.

Figure 19:
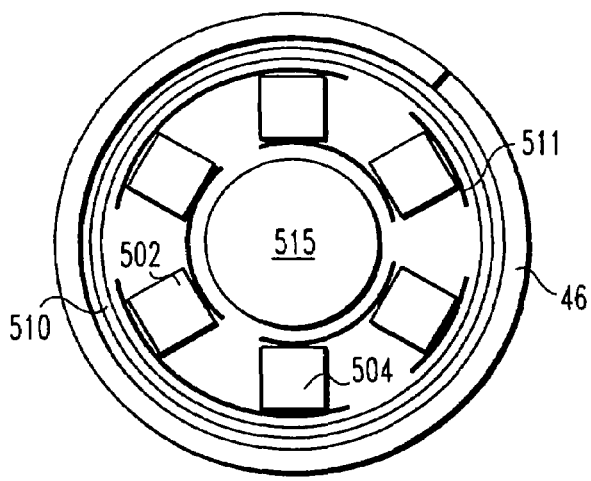
FIG. 19 is a diagrammatic top view of an arrangement of a shape memory spring and thermoelectric heater.

FIG. 19 is a top diagrammatic view of a spring 46 heated internally by a plurality of semiconductors 502 and 504. A first thermally conductive layer is placed between the semiconductors and the inner diameter of the spring and may or may not touch the spring. In some embodiments there is a second thermally conductive layer (here shown as a cross section of a thermally conductive post 515) located within the inner diameter of the semiconductive elements, so as to provide a conductive path for heat being transferred to or from the spring travelling along thermally conductive post 515 into a plate or other heat sink. Although this arrangement of thermoelectric elements may be difficult to fit within a spring 46 as used within a modular braille cell described herein, the present invention also contemplates versions of shape memory spring and pin actuators which are larger and which would accommodate the internal heaters.

The present invention also includes an embodiment in which the thermoelectric element is placed between two shape-memory material springs 46 and 44. In this embodiment, actuation of the heater heats one shape-memory spring and simultaneously cools the other shape-memory spring.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method for heat treating a spring, comprising:
   providing a coil spring with a first outer diameter and a first length fabricated from a shape memory material;
   providing a member defining a chamber with an inner diameter and a length, the chamber length being greater than the length of the spring and the chamber inner diameter being greater than the outer diameter of the spring;
   placing the spring in the chamber;

heating the chamber and spring to more than about 400 degrees C. and less than about 600 degrees C. for a period of mote than about two minutes; and permitting the spring outer diameter to grow to the inner diameter of the chamber, and permitting the spring length to grow to the length of the chamber.

2. The method of claim 1 which further comprises:

heating the chamber and spring after said permitting to more than about 900 degrees C. for a period of less than about ten seconds; and quenching the chamber and spring in water.

3. The method of claim 1 which further comprises:

removing the spring from the chamber after said permitting;

putting the spring in a fuel rich flame for more than about one second and less than about five seconds, said putting being after said removing.

4. The method of claim 3 which further comprises quenching the spring in water after said putting.

* * * * *